(12) United States Patent
Movsesyan et al.

(10) Patent No.: US 8,880,107 B2
(45) Date of Patent: Nov. 4, 2014

(54) SYSTEMS AND METHODS FOR MONITORING COMMUNICATIONS

(75) Inventors: Edward Movsesyan, Oakland Gardens, NY (US); Igor Slavinsky, New York, NY (US)

(73) Assignee: Protext Mobility, Inc., Delray Beach, FL (US)

( * ) Notice: Subject to any disclaimer, the term of this patent is extended or adjusted under 35 U.S.C. 154(b) by 327 days.

(21) Appl. No.: 13/016,848

(22) Filed: Jan. 28, 2011

(65) Prior Publication Data

US 2012/0196629 A1 Aug. 2, 2012

(51) Int. Cl.
*H04W 4/14* (2009.01)
*H04L 29/06* (2006.01)
*G06Q 10/10* (2012.01)
*H04M 3/22* (2006.01)
*H04L 29/08* (2006.01)
*H04L 12/58* (2006.01)

(52) U.S. Cl.
CPC ............... *H04L 67/22* (2013.01); *H04L 63/10* (2013.01); *G06Q 10/107* (2013.01); *H04M 3/2218* (2013.01); *H04M 2203/6027* (2013.01); *H04M 2203/556* (2013.01); *H04L 12/5885* (2013.01); *H04M 3/2281* (2013.01); *H04L 51/34* (2013.01)
USPC ........... 455/466; 455/436; 455/456; 455/450; 455/454; 455/500; 370/235; 370/252; 370/352; 370/338; 370/401; 726/22; 726/23; 726/24; 726/25; 726/26; 704/500; 704/501; 704/503; 704/245; 704/255

(58) Field of Classification Search
USPC ................ 455/466, 436, 456, 500, 450, 454; 726/22–27; 370/235, 252, 352, 401, 370/338; 704/500, 501, 503, 245, 255
See application file for complete search history.

(56) References Cited

U.S. PATENT DOCUMENTS

| | | | |
|---|---|---|---|
| 8,380,176 B2 | 2/2013 | Adler et al. | |
| 2008/0282338 A1* | 11/2008 | Beer | 726/12 |
| 2009/0028135 A1* | 1/2009 | Mantripragada et al. | 370/352 |

OTHER PUBLICATIONS

Website: http://www.mymobilewatchdog.com/productinfo.shtml; "The Best Child Monitoring Software for Mobile Phone!" download date Jun. 21, 2013; 2 pps.
Website: http://websafety.com/features/; "WebSafety" download date Jun. 21, 2013; 1 pp.
Website: http://www.cellpolice.com/; "Cell Police" download date Jun. 21, 2013; 3 pps.

\* cited by examiner

*Primary Examiner* — Michael T Vu
(74) *Attorney, Agent, or Firm* — Fincham Downs, LLC; Magdalena M. Fincham

(57) ABSTRACT

In one embodiment, a method provides for monitoring and analyzing communications of a monitored user on behalf of a monitoring user, to determine whether the communication includes a violation. For example, SMS messages, MMS messages, IMs, e-mails, social network site postings or voice mails of a child may be monitored on behalf of a parent. In one embodiment, an algorithm is used to analyze a normalized version of the communication, which algorithm is retrained using results of past analysis, to determine a probability of a communication including a violation.

17 Claims, 15 Drawing Sheets

400 ↘

| SUBSCRIBER ACCOUNT # 405 | COMMUNICATION ADDRESS 410 | ... | MONITORED SUBSCRIBER? 415 | |
|---|---|---|---|---|
| 123-456-7890 | 000-555-1111 | | Y | |
| 234-5567-8901 | BOB@GMAIL.COM | | Y | |
| 345-678-9012 | 1.260.10.333 | | N | |
| 345-678-9012 | 000-555-2222 | | Y | |
| | | | | |

R400-1 → (row 1)
R400-2 → (row 2)
R400-3 → (row 3)
R400-4 → (row 4)

| MONITORING USER ID: | | 502 |
|---|---|---|
| USER NAME: | | 504 |
| NOTIFICATION ADDRESS: | ALICE@GMAIL.COM | 506 |
| PASSWORD: ******** | | 508 |
| MOBILE NETWORK PROVIDER: AT&T | | 510 |
| MONITORED USER NAME 512 | MONITORED USER ADDRESS 514 | MONITORED USER ID 516 |
|  |  |  |

500B

| MONITORING USER ID: | | 518 |
|---|---|---|
| SENSITIVITY: | | 520 |
| MONITORED CATEGORIES: | | 522 |
| CUSTOM WORDS / PHRASES: | | 524 |
| MOBILE NETWORK PROVIDER: AT&T | | 510 |
| ADDRESS BOOK: | TELEPHONE NUMBERS 526a | NAME 526b |
|  |  | 526 |

| COMMUNICATION ADDRESS: 000-555-1111 | | | | 602 |
|---|---|---|---|---|
| DATE: 12/30/2010 | | | | 604 |
| TIME 606 | THIRD PARTY COMMUNICATION ADDRESS 608 | TEXT 610 | VIOLATION(S) 612 | CONFIRMED DELIVERY? 614 |
| 9:21 AM | 111-222-3333 | Hi...U awake? | 0 | Y |
| 9:22 AM | 111-222-3333 | I'm alone | 1 | Y |
| 9:23 AM | 222-333-4444 | Congradulations | 0 | Y |
| 11:17 AM | 111-222-3333 | Where are u? | N/A | N |

FIG. 6

| WORD / PHRASE 702 | SENSITITVITY 704 | CATEGORY 706 |
|---|---|---|
| EXTREME HARDCORE | 1 | 10 |
| WILD CAT | 5 | 10 |
| LEGAL TEEN VIDEOS | 1 | 10 |
| HEAT SEEK LOVE MUSSIL | 1 | 3 |
| WANNA HER | 2 | 5 |
| BE UPSET | 1 | 1 |
| RICK SPIKE LEMONAD | 6 | 10 |
| GAMBL ODD | 3 | 10 |
| STRIP POKER | 1 | 10 |
| FREE BALLOON | 1 | 10 |
| RASTA WEED | 5 | 10 |

1400

MONITORED PARTY: [                    ▼]   ← 1405

◁ DECEMBER 2010 ▷ | COMMUNICATIONS ON: 12/30/10

| S | M | Tu | W | Th | F | S |
|---|---|----|---|----|---|---|
|   |   |    |   | 1  |(2)| 3 | 4 |
| 5 | 6 | 7  | 8 | 9  | 10| 11|
| 12| 13| 14 |(15)|(16)|(17)| 18|
| 19| 20|(21)| 22| 23|(24)| 25|
| 26| 27| 28 | 29|(30)| 31|   |

○ = DATE HAS COMMUNICATION

1410

| TIME | MOBILE # | SMS(S) | VIOLATIONS |
|------|----------|--------|------------|
| 9:21 AM | 111-555-3333 | 3 | 2 |
| 11:17 AM | 222-555-4444 | 1 | 0 |
| 11:19 AM | 111-555-3333 | 2 | 1 |

1415

COMMUNICATION DETAILS:

| SENT/RECIEVED | TIME | MOBILE # | TEXT |
|---------------|------|----------|------|
| S | 9:21 AM | 111-555-3333 | Hi...r u alone? |
| R | 9:21 AM | 111-555-3333 | Yup...comin over? |
| S | 9:21 AM | 111-555-3333 | Yeah. Bringing beer. |

SYSTEMS AND METHODS FOR MONITORING COMMUNICATIONS

BRIEF DESCRIPTION OF THE DRAWINGS

The foregoing and other features, aspects and advantages of the invention are described in detail below with reference to the drawings of various embodiments, which are intended to illustrate and not to limit the invention. The drawings comprise the following figures in which:

FIG. 4 is an example table of one embodiment of a subscriber services database, which may be stored, for example, for use by a mobile network provider server, in accordance with some embodiments.

FIG. 5 is an example table of one embodiment of a user account database, which may be stored, for example, for use by a communications monitoring/analyzer server, in accordance with some embodiments.

FIG. 6 is an example table of one embodiment of a communication database, which may be stored for use by a communication monitoring/analyzer server, in accordance with some embodiments.

FIG. 14 is an example user interface that may be utilized to provide information about Communications to a Monitoring User in accordance with some embodiments.

DETAILED DESCRIPTION OF THE EMBODIMENTS

Figure 1:
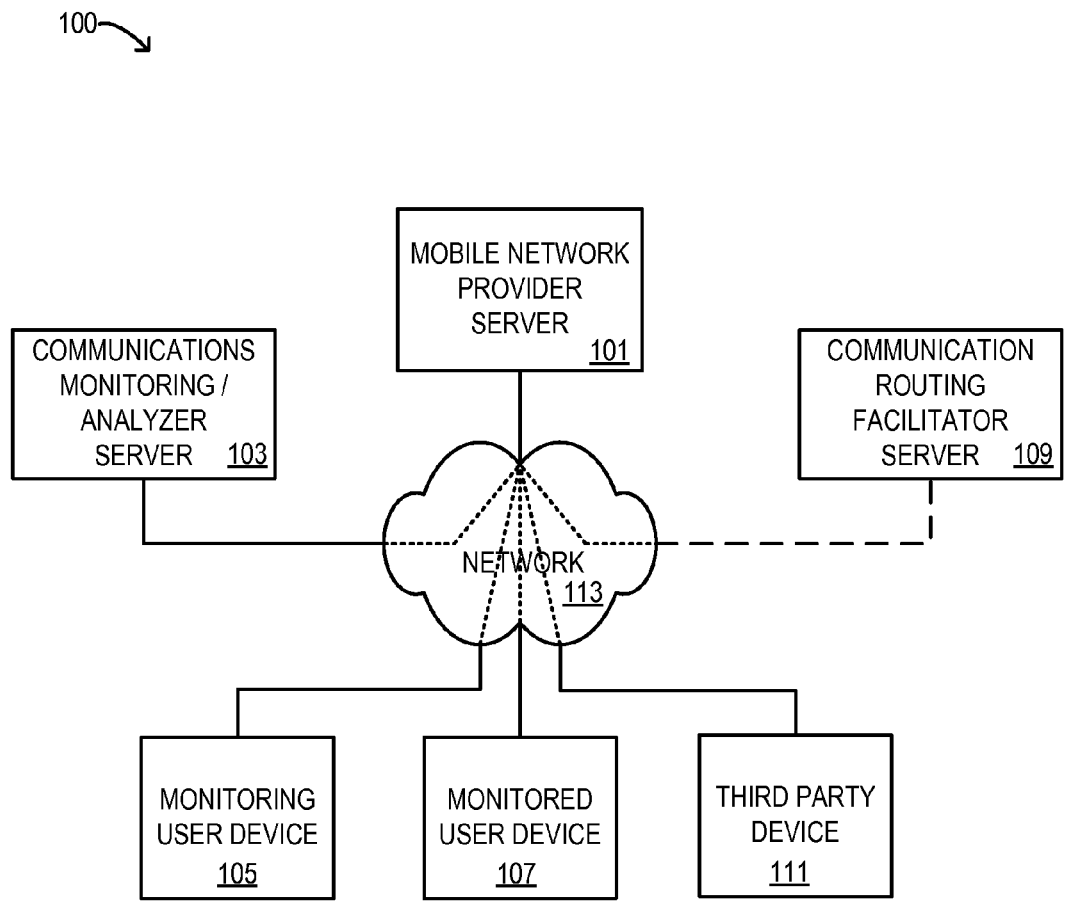
FIG. 1 is a schematic diagram of an embodiment of a system for facilitating wireless communication among communication devices, in accordance with some embodiments.

Certain aspects, advantages, and novel features of the invention(s) are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention(s) described herein extend(s) beyond the specifically disclosed embodiments, examples and illustrations and includes other uses of the invention(s) and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Applicants have recognized that users (or guardians, friends or family of users) of computing devices comprising communication devices (for example but not limited to a handheld smart phone such as a BLACKBERRY, IPHONE, or another portable computing device operable to receive and/or send wireless communications) face concerns regarding various aspects of communications to/from such devices. Examples of such aspects include the appropriateness and safety of such communications. For example, people (such as parents or guardians of children or adult family members of the elderly) may be concerned about (i) the language, tone, content and/or topics included in the child or elderly persons communications; (ii) the identity of the senders from whom communications are being received and/or recipients to whom communications are being sent; and/or (iii) the frequency (or time or pattern associated with) communications received and/or sent.

Applicants have further recognized that the tools available prior to the embodiments described herein for monitoring wireless communications in order to address such concerns are inadequate. For example, many such tools require installation of software onto the communication device of the person whose communications are to be monitored. Such solutions suffer from a variety of shortcomings, such as: (i) they are prone to being circumvented (the person being monitored can uninstall, tamper with or otherwise incapacitate the application), (ii) they unnecessarily use the limited resources of the device receiving/sending the monitored communications (e.g., depleting battery power and using up processing power that could otherwise be used for different purposes), (iii) have inherent limitations as to when such a monitoring activity or service can be initiated (i.e., to when the communication device has access to an allowed network such that the application can be downloaded and initiated) and (iv) are otherwise unduly cumbersome (e.g., copy of the application has to be downloaded and initiated each time a communication device of a user whose communications are to be monitored is replaced). Thus, Applicants describe herein systems and methods which allow for a user to register one or more communication devices to be monitored in a manner that overcomes the shortcomings of the systems and methods which depend upon the downloading and maintenance of proprietary monitoring software to the communication device being monitored. In accordance with one embodiment, Applicants describe a system which works with a mobile network provider (e.g., a cellular or satellite network provider which facilitates communications among communication devices), such that the mobile network provider provides (directly or through a third party facilitator) a copy of each qualifying communication to a third party monitoring/analyzer service as it also forwards the communication to the device for which it was intended. A qualifying communication that is so copied and forwarded to the third party monitoring/analyzer service is a communication to and/or from a communication device that has been successfully registered to have its communications monitored. In one embodiment, the third party monitoring/analyzer service analyzes each such copy of a communication to determine whether it includes a violation and, if a violation is identified, provides information about the communication to the user who registered to receive information about the communications being monitored.

In one embodiment, the third party monitoring/analyzer service calculates a probability that a communication includes a violation or otherwise includes questionable or inappropriate content and outputs an alert to a monitoring user, alerting the monitoring user to the possibly questionable or inappropriate communication if the probability calculated for the communication is above a predetermined threshold. This may be done in addition to or in lieu of determining whether a Communication includes a Violation by comparing the text of the Communication (e.g., after normalizing the Communication) to words or phrases predetermined to be Violations (e.g., in a general dictionary of Violations as designated by one or more experts and/or in a custom dictionary of Violations specified by a Monitoring User).

In accordance with some embodiments, the systems, methods, and devices do not require the communication device to download any software to allow for the monitoring and/or analyzing of communications to and/or from the communication device. In one or more embodiments, the systems, methods, and devices do not require the communication device of a monitored user to have access or connectivity to a network upon receiving a communication in order for a monitoring user to be alerted to a communication which includes a violation or to register a monitored user.

In accordance with some embodiments, a delay in the analysis of the copies of the communications so received from the mobile network provider is provided to ensure compliance with certain privacy laws of certain jurisdictions (e.g., the analysis of the communication is not performed until a confirmation is received from the mobile network provider that the communication was successfully transmitted to the intended communication device and/or until a predetermined period of time to allow for such successful transmission to the intended communication device).

Distinct from the need for an improved solution for monitoring communications to/from communication devices, Applicants have recognized that the methodologies and software available prior to the embodiments described herein for analyzing the content of communications are too simplistic to be adequately useful in that they either over-identify too many communications as possibly problematic or under-identify communications that are truly problematic. For example, most of the methodologies are limited to merely checking for predetermined words that are considered inappropriate and flagging the Communications that include such words verbatim.

Thus, Applicants additionally describe herein systems and methods which allow for a more intelligent analysis of communications, one that uses a multi-level analysis approach to analyze the communications. In one embodiment, a mix of software components or tools is used to analyze a communication, which components may be added or deleted to allow for a customized analysis tool. In one embodiment, a first component comprises a normalization filter, a second component comprises a synonym filter and a third component comprises a Bayesian algorithm analyzer (each of which components is described in detail below). The Bayesian algorithm analyzer is used, in accordance with some embodiments, to calculate (i) a probability, for each word or phrase in a set of words and/or phrases that may appear in Communications, the probability being indicative of a Communication that includes the word to be a Communication which includes a Violation or questionable content to which a Monitoring User should be alerted; and (ii) a probability that a particular Communication includes a Violation or questionable content to which a Monitoring User should be alerted, based on the actual words or phrases included in the Communication (or normalized versions thereof). In some embodiments, the Bayesian algorithm analyzer component is trained and retrained (and its data set updated as a result) based on intelligence gained from previous analyses. It should be noted that the intelligent communication analysis systems and methods described herein are not limited to being used on the described systems and methods for registering and monitoring one or more communication devices in accordance with the embodiments described herein.

A brief explanation of some terms used throughout the present description is now provided in alphabetical order, to aid in the understanding of the present description:

Communication:

A Communication, as the term is used herein unless indicated otherwise, is any message, notification, information, data or transmission sent to or from a WCD, whether it be text-based (e.g., a text or SMS (short message system) message, an e-mail message, an attachment to an e-mail message, a fax, an Instant Message (IM), a posting (or notification of a posting) to a website (e.g., a social networking site such as FACEBOOK or MYSPACE), a Multi-Media Message (MMS) or voice-based (e.g., a voice mail, audio or video file).

Communication Device:

A Communication Device, as the term is used herein unless indicated otherwise, refers to a computing device operable to send and/or receive Communications. In some embodiments, a Communication Device may be operable to send and/or receive Communications over a wireless network (e.g., a radio or satellite network) and/or may be a portable or mobile device. Examples of such mobile Communication Devices include cellular telephones and satellite telephones, smartphones (e.g., APPLE IPHONE, BLACKBERRY PHONE, an ANDROID platform-based telephones which are capable of facilitating not only voice and text-based messages but also allow for web browsing and for running relatively complex software applications), cordless telephones, personal digital assistants (PDAs), pagers or any other device which facilitates Communications. In some embodiments, a Communication Device may be a stationary computing device (e.g., a desktop or personal computer). In some embodiments, a Communication Device may be integrated into another system, packaging, structure or device, such as a vehicle, wearable apparel, entertainment system and/or be operable to dock or connect with a wireless enabling accessory system (e.g., a Wi-Fi docking system). In some embodiments, a Communication Device may be operable to synchronize with a local or remote computing system to receive, download or upload Communications, download software applications and to receive and/or transmit other data.

Communications Monitoring/Analyzer Service:

A Communications Monitoring/Analyzer Service, as the term is used herein unless indicated otherwise, is a service provided by an entity that is distinct from a Mobile Network Provider, which monitors and analyzes Communications of Monitored Users and provides information based on such analysis and Communications to Monitoring Users. In some embodiments, the Communications Monitoring/Analyzer Service works with a plurality of Mobile Network Providers to provide monitoring and analysis services to users by obtaining copies of Communications from each Mobile Network Providers which correspond to users who have been provisioned to have their Communications so monitored and analyzed.

Monitored User:

A Monitored User, as the term is used herein unless indicated otherwise, refers to a user who has his communications monitored on behalf of a Monitoring User. Examples of Monitored Users include, without limitation, a child, an elderly or other vulnerable person and an employee. In some embodiments, prior to a completion of a registration to have information about the communications of a Monitored User provided to a Monitoring User, consent is obtained from the Monitored User. The consent may be obtained, for example, upon registration and/or at one or more times subsequent to registration (e.g., upon receiving a communication sent to or from the Monitored User but prior to analysis of the communication, on a periodic, non-periodic or random basis). In some embodiments, consent from a party communicating with the Monitored User (e.g., a person from whom a communication is received by the Monitored User or to whom the Monitored User transmits a communication) is also obtained prior to providing information about the communication to the Monitoring User and/or prior to providing a copy of the communication to the third party monitoring/analyzer service provider.

Monitoring User: A Monitoring User, as the term is used herein unless indicated otherwise, is a user who registers to receive information about the Communications of another user. Examples of a Monitoring User include, without limitation, a parent or guardian of a child, an adult concerned about the wellbeing of an elderly family member or friend or another vulnerable person, and an employer concerned about the Communications of an employee. It should be understood that, as described herein, a third party monitoring/analyzer service may be used to facilitate such monitoring, such that the Monitoring User need not review and/or monitor all Communications from the user whose Communications are being monitored. Rather, the Monitoring User may request (and in some embodiments provide payment for such services) that the third party monitoring/analyzer service monitor and analyze all such Communications from a specified Communication Device of the user whose Communications are to be monitored and to only alert the Monitoring User or provide information to the Monitoring User about Communications that meet certain criteria. Communications that meet such certain criteria (which criteria and the application thereof are described in detail below) are referred to as Communications which include a Violation (described below) or, for Communications analyzed for a probability of including a Violation, as Questionable Communications (defined below). The information about a Communication which includes a Violation (which information is provided to the Monitoring User) or which qualifies as a Questionable Communication, may include, for example (i) a copy of the Communication itself (e.g., the content, envelope information (to/from/time sent and/or received); (ii) a summary of the Communication and/or (iii) an explanation of the violation or content of the Communication which caused the information to be provided to the Monitoring User (e.g., an indication of the violation and/or a category of a Violation). In some embodiments, a Monitoring User may be "alerted to" or provided with an "alert" of a Communication which includes a Violation or which qualifies as a Questionable Communication. An alert may comprise providing a notification to the Monitoring User via an SMS, MMS, IM or e-mail message or providing an indicator to the Monitoring User of the Communication as one which includes a Violation or as one which qualifies as a Questionable Communication via a user interface (e.g., a web interface) which the Monitoring User logs into at his/her convenience.

Questionable Communication:

A Questionable Communication, as the term is used herein unless indicated otherwise, is a Communication which has been analyzed (or a copy of which has been analyzed) using a Bayesian Algorithm and for which a probability above a predetermined threshold has been calculated, the probability being indicative of the Communication including a Violation or questionable or inappropriate content, such that a Monitoring User should be alerted to the Communication and the probability that it includes a Violation or other questionable or inappropriate content. In one embodiment, the probability for the Communication is calculated based on the probabilities corresponding to one or more words or phrases included in the Communication (as is described below with respect to FIG. 13A and FIG. 13B).

Violation:

A Violation, as the term is used herein unless indicated otherwise, is a (i) breach of a rule which defines what is an allowable characteristic for a Communication; or (ii) satisfaction of a condition which defines non-allowed characteristic for a Communication. A characteristic of a Communication may have to do with, for example and without limitation: (i) a sender of a Communication; (ii) a recipient of a Communication; (ii) a topic of a Communication; (iii) a subject line of a Communication; (iv) the content (e.g., actual words, images or graphics used or synonym or normalized versions thereof) of a Communication; and (v) a frequency or time of a Communication. As an example, of (i), a rule associated with a particular Monitored User (e.g., a rule as selected by a Monitoring User) may be that only a predefined list of senders and recipients are considered "safe" for a Monitored User associated with the Monitoring User. Thus, any Communication from a sender or to a recipient who is not on the "safe" list of senders and recipients would be considered a breach of the rule and the Communication would be considered as one which includes a Violation. In an example of (ii), a rule may state that any Communication which includes the word "sex" or "cocaine" includes a violation, thus a Communication which includes one or both of these words is to be considered one which includes a Violation.

Referring now to FIG. 1, illustrated therein is an example system 100 consistent with one or more embodiments. The system 100 comprises a Mobile Network Provider Server 101, a Communications Monitoring/Analyzer Server 103, a Monitoring User Device 105, a Monitored User Device 107, a Communication Routing Facilitator Server 109 and a Third Party Device 111.

In some embodiments, one or more of these devices may each be operable to communicate with at least one other device of system 100 via a network 113. The network 113 may comprise, for example, a mobile network such as a cellular, satellite or pager network, the Internet, a wide area network, another network or a combination of such networks.

It should be understood that although not shown in FIG. 1, other networks and devices may be in communication with any of the devices of system 100 and/or that network 113 may comprise two or more networks operable to facilitate the routing of Communications among the devices of system 100. For example, in one embodiment, both the Internet and a wireless cellular network may be involved in routing Communications among two or more devices of the system 100.

In some embodiments, additional devices that are not show in FIG. 1 may be part of a system 100. For example, one or more servers operable to serve as wireless network gateways or routers may be part of system 100. In another example, a server of an aggregator service may part of system 100. An aggregator service may be, for example, an entity which serves to aggregate requests and registrations of users who desire to become Monitoring Users, the requests being to register (and, in some embodiments, provide or authorize payment for monitoring services) Monitored User devices in order to have the Communications of such Monitored User devices monitored. For example, in some embodiments a user who desires to become a Monitoring User may access a website hosted by or affiliated with a Communications Monitoring/Analyzer Service and request to register one or more Monitored Users in order to have the Communications of such proposed Monitored Users be monitored on his/her behalf. In some embodiments the Communications Monitoring/Analyzer Server 103 may in some embodiments communicate directly with a Mobile Network Provider Server 101 of the Mobile Network Provider to which the proposed Monitored User (and/or proposed Monitoring User) is subscribed in order to provision the Monitored User for such monitoring services. However, in other embodiments the Communications Monitoring/Analyzer Server 103 may work through an aggregator service server (not shown) to facilitate such registration or provisioning of a new Monitored User-Monitoring User pairing with the appropriate Mobile Network Provider.

The Mobile Network Provider Server 101 may comprise one or more computing devices, working in parallel or series if more than one, operable to facilitate the routing of Communications between Communication Devices. In one embodiment, the Mobile Network Provider Server comprises a Short Messaging Service Center Server, operable to facilitate the routing and regulation of text (or other short) messages between Communication Devices. In some embodiments, a plurality of different Mobile Network Providers are part of system 100, such that Communications Monitoring/Analyzer Server 103 is in communication (either directly or via one or more other entities, such as one or more aggregator service servers or one or more Communication Routing Facilitator Servers 109) with a plurality of Mobile Network Provider Servers. Each such Mobile Network Provider Server may, in such embodiments, in turn be operable to communicate with or facilitate the routing of Communications among a plurality of Communication Devices (e.g., the Communication Devices of its subscribers).

The Communications Monitoring/Analyzer Service 103 may comprise one or more computing devices, working in parallel or series if more than one, operable to facilitate the monitoring and/or analysis of Communications (or copies of Communications) received from a given Mobile Network Provider Server 101. It should be noted that in some embodiments a Communication (or copy of a Communication) may be transmitted from a Mobile Network Provider Server 101 to a Communications Monitoring/Analyzer Server 103 directly while in other embodiments (as illustrated by the dotted lines), the Communication (or copy of a Communication) may be routed from a given Mobile Network Provider Server 101 by way of a third party Communication Routing Facilitator Server 109. A Communication Routing Facilitator may be an entity whose task it is to route copies of Communications from a Mobile Network Provider to the Communications Monitoring/Analyzer Service.

A Monitoring User Device 105 may comprise a Communication Device associated with a Monitoring User (e.g., a personal computer, a cellular telephone or a smartphone). A Monitored User Device 107 may comprise a Communication Device associated with a Monitored User (e.g., a personal computer, a cellular telephone or a smartphone). A Third Party Device 111 may comprise a Communication Device associated with a user who is not a Monitored User but who is receiving a Communication from, or who has sent a Communication to, a Monitored User. As described herein, in some embodiments, consent from such a third party user may be required prior to analyzing a Communication involving the third party user and/or prior to providing to a Monitoring User information about a Communication involving the third party user. In other embodiments, while consent from such a third party user may not be required, the third party user may nevertheless be notified or informed that a Communication with which the third party user is associated is to be (or has been) analyzed by the Communications Monitoring/Analyzer Service and/or that information about the Communication has been (or will be) provided to the Monitoring User (the identity of the Monitoring User may be withheld from the third party user in some embodiments).

It should be understood that while any of the devices 103, 105, 107, 109 and 111 may transmit Communications to one another via the Mobile Network Provider Server 101, in some embodiments some or all of the devices of system 100 may communicate with one or more other devices of the system 100 directly or indirectly, via a wired or wireless medium such as the Internet, LAN, WAN or Ethernet, Token Ring, or via any appropriate communications means or combination of communications means. In some embodiments, communication among any of the devices of system 100 may occur over radio signals, cable TV, satellite links and the like.

The system 100 may be operable to facilitate communication using known communication protocols. Possible communication protocols that may be useful in the system 100 include, but are not limited to: Ethernet (or IEEE 802.3), ATP, BLUETOOTH, SMPP Protocol (e.g., SMPP Protocol Version 3.4), HTTP, HTTPS, and Transmission Control Protocol/Internet Protocol (TCP/IP). Communications may be encrypted to ensure privacy and prevent fraud in any of a variety of ways well known in the art, some of which are described herein.

It should be understood that a Mobile Network Provider Server 101 may be in communication with any number of user Communication Devices, which may include a plurality of Monitoring User Devices, a plurality of Monitored User Devices and/or a plurality of third party. The number and/or classification (as a Monitored User or Monitoring User (or in some circumstances both a Monitored User and a Monitoring User) may change over time as users are added/registered with the Mobile Network Provider and/or as accounts of Monitored Users and Monitoring Users are provisioned.

Figure 2:
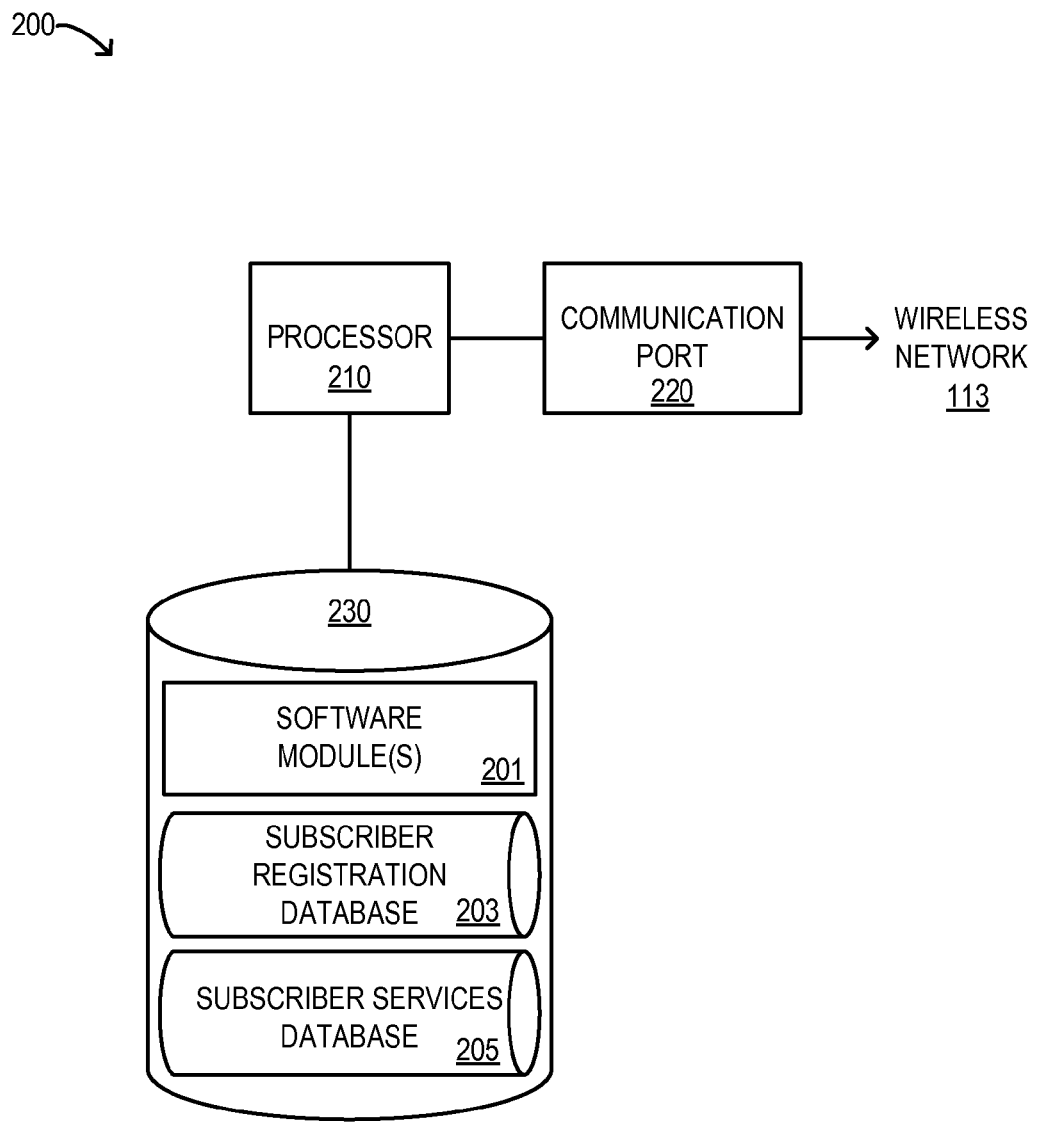
FIG. 2 is a block diagram of an embodiment of a mobile network provider server, in accordance with some embodiments.

Referring now to FIG. 2, illustrated therein is a block diagram of a Mobile Network Service Provider Server 200 (which may be one embodiment of Mobile Network Provider Server 101 of FIG. 1). The Mobile Network Service Provider Server 200 may be implemented as a system controller, a dedicated hardware circuit, an appropriately programmed general-purpose computer, or any other equivalent electronic, mechanical or electro-mechanical device. The Mobile Network Provider Server 200 may comprise, for example, one or more server computers operable to communicate with (a) one or more Communication Devices, (b) Communications Monitoring/Analyzer Server 103 (of FIG. 1), (c) one or more third party servers (e.g., a Communication Routing Facilitator Server 109 of FIG. 1 or an aggregator service server for facilitating the provisioning of one or more subscribers to a communication monitoring service by Communications Monitoring/Analyzer Server 103) and/or (d) one or more additional devices (e.g., gateway server, router devices or other devices for facilitating the routing or management of Communications among devices over a wireless or other network). The Mobile Network Service Provider Server 200 may be operable to facilitate some functions or procedures described herein, such as the forwarding of copied Communications to Communications Monitoring/Analyzer Server 103. The Mobile Network Service Provider Server 200, as well as other devices described herein (such as Communications Monitoring/Analyzer Server 103 and/or a Communication Device), as well as components thereof, may be implemented in terms of hardware, software or a combination of hardware and software.

In one embodiment, the Mobile Network Provider Server 200 may comprise a Short Message Service Center (SMS-C) server (which may be operated directly by the Mobile Network Provider or by another entity on behalf of or otherwise for the Mobile Network Provider). In such an embodiment, the Mobile Network Provider Server 200 may be operable to route, regulate and manage SMS Communications and information about subscribers to such a service. Also, in such an embodiment the Mobile Network Service Provider Server 200 may communication with another peer device, such as the Communications Monitoring/Analyzer Server 103, the Communication Routing Facilitator Server 109 or another peer device, via the Short Message Peer-to-Peer Protocol (SMPP Protocol).

The Mobile Network Service Provider Server 200 comprises a processor 210, such as one or more INTEL PENTIUM processors. The processor 210 is in communication with a communication port 220. Communication port 220 comprises a component (which can be embodied as hardware, software and/or firmware) for communicating, directly or indirectly, with one or more other devices, such as one or more Communication Devices and/or Mobile Network Service Provider Server 101). For example, a communication port 220 provides the Mobile Network Service Provider Server 200 the capability of receiving Communications (e.g., SMS messages) from Communication Devices and routing such Communications to other Communication Devices or other types of devices. A communication port 220 may be operable to work in various language and protocol environments, as would be understood by one of ordinary skill in the art (e.g., http, TCP/IP, SMPP).

The processor 210 is further in communication with a memory 230. The memory 230 may comprise an appropriate combination of magnetic, optical and/or semiconductor memory, and may include, for example, Random Access Memory (RAM), Read-Only Memory (ROM), a compact disc and/or a hard disk. The processor 210 and the memory 230 may each be, for example: (i) located entirely within a single computer or other device; or (ii) connected to each other by a remote communication medium, such as a serial port cable, telephone line or radio frequency transceiver. In one embodiment, the Mobile Network Service Provider Server 200 may comprise one or more devices that are connected to a remote server computer for maintaining databases.

The memory 230 stores a one or more software module(s) 201 for directing the processor 210 to perform certain functions. The processor 210 performs instructions of the one or more software module(s) 201, and thereby operates in accordance with at least some of the methods described in detail herein. The software module(s) 201 may be stored in a compressed, uncompiled and/or encrypted format. The software module(s) 201 may include program elements that may be necessary, such as an operating system, a database management system and "device drivers" for allowing the processor 210 to interface with computer peripheral devices. Appropriate program elements are known to those skilled in the art, and need not be described in detail herein. According to an embodiment, the instructions of any or all of the software module(s) 201 may be read into a main memory from another computer-readable medium, such from a ROM to RAM. Execution of sequences of the instructions in the software module(s) 201 causes processor 210 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 230 further stores a Subscriber Information Database 203, which stores information about users subscribed to the Mobile Network Provider's services or otherwise registered with the Mobile Network Provider. Such information may include, for example, a telephone number for a wireless telephone associated with a subscriber, the name and postal address of the subscriber, an account number, an e-mail address, an SMS name, peer-to-peer information and/or other information. The memory 230 further stores a Subscriber Services Database 205, which stores information about preferences or optional services associated with a subscriber or subscriber's account. For example, a subscriber may have elected to receive weather information, sports scores for a favorite team, stock value information for one or more stocks, patient files for doctors and an indication of whether the subscriber has been provisioned for certain available programs or services.

In one embodiment, the Subscriber Services Database 205 stores an indication of whether a particular subscriber has been provisioned to have his/her Communications monitored via the Communications Monitoring/Analyzer Service described herein. Thus, for example, if a particular subscriber record stores an indication that the subscriber has been successfully registered for the Communications Monitoring/Analyzer Service, the processor of the 210 may recognize this indication as a trigger for initiating a process for transmitting a copy of each Communication of that subscriber (e.g., each Communication sent to a Communication Device of that subscriber and/or each Communication sent from a Communication Device of that subscriber, depending on the implementation) to the Communications Monitoring/Analyzer Service (either directly or indirectly via a third party facilitator service, such as one provided by a Communication Routing Facilitator Server 109 of FIG. 1). In some embodiments, as described in more detail below, a Mobile Network Service Provider may be requested to provide to the Communications Monitoring/Analyzer Service (directly or via a third party facilitator) a confirmation that a particular Communication has been successfully transmitted to a Monitored User's Communication Device. In such embodiments, the Mobile Network Service Provider Server 200 may be programmed to recognize that, for subscribers who have been provisioned for the Communications Monitoring/Analyzer Service, an indication of the successful transmission of the Communication is to be transmitted to the Communications Monitoring/Analyzer Server 103 (directly or via a third party facilitator). Such instructions may be part of the one or more software module(s) 101 stored in memory 230. An example table illustrating one embodiment of a Subscriber Services database 205 is described below with respect to FIG. 4.

Although the databases 203 and 205 are described as being stored in a memory of Mobile Network Service Provider Server 200, in other embodiments some or all of these databases may be partially or wholly stored, in lieu of or in addition to being stored in a memory of Mobile Network Service Provider Server 200, in a memory of one or more other devices. Such one or more other devices may comprise, for example, another computing device with which Mobile Network Service Provider Server 200 is operable to communicate. Further, some or all of the data described as being stored in the memory 230 may be partially or wholly stored (in addition to or in lieu of being stored in the memory 230) in a memory of one or more other devices. Such one or more other devices may comprise, for example, a remote storage service server (e.g., an online back-up storage server, as would be understood by one of ordinary skill in the art).

Figure 3:
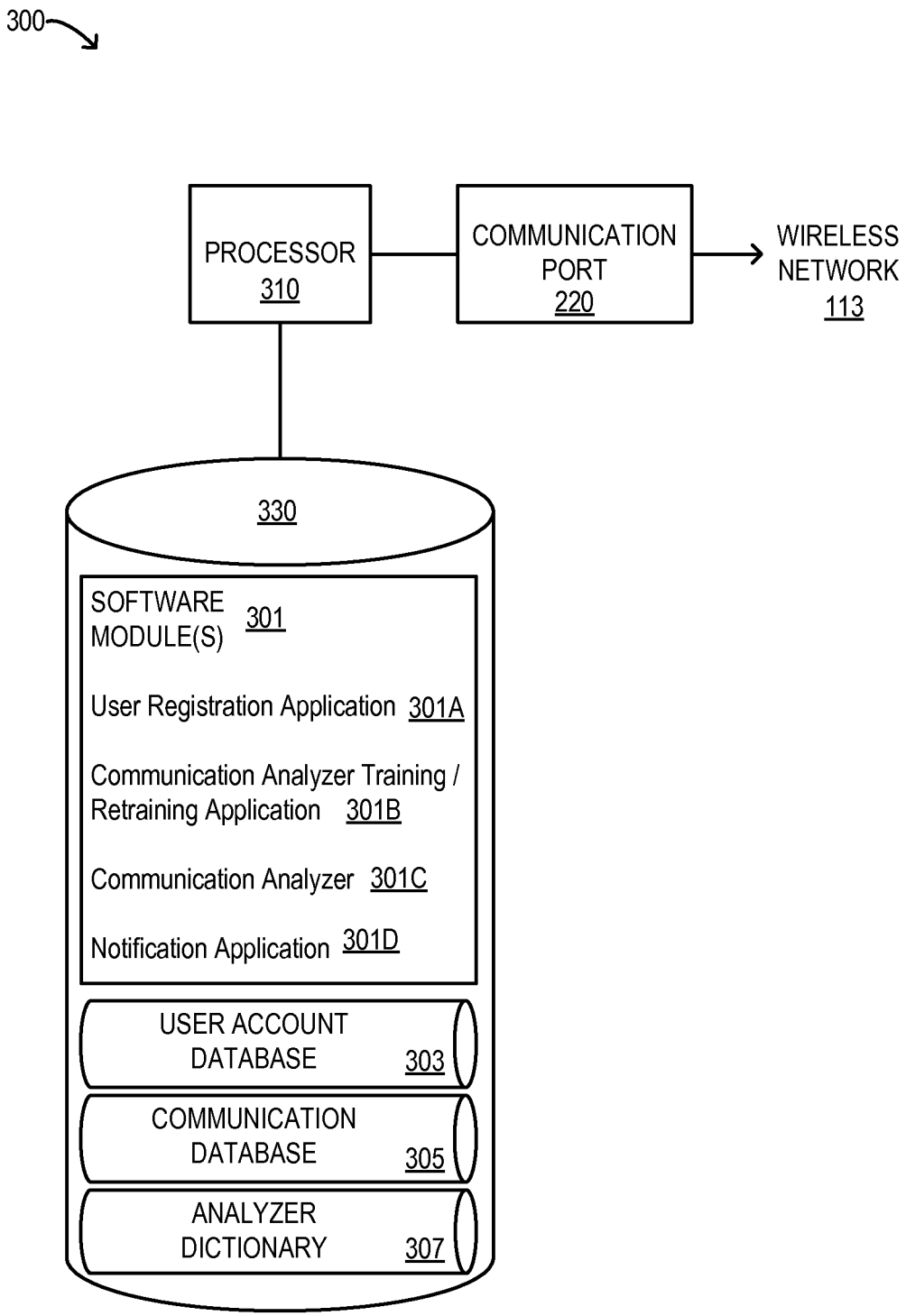
FIG. 3 is a block diagram of an embodiment of a communications monitoring/analyzer server, in accordance with some embodiments.

Referring now to FIG. 3, illustrated therein is a block diagram of a Communications Monitoring/Analyzer Server 300, which may be an embodiment of the Communications Monitoring/Analyzer Server 103 of FIG. 1. The Communications Monitoring/Analyzer Server 300 may be implemented as a system controller, a dedicated hardware circuit, an appropriately programmed general-purpose computer, or any other equivalent electronic, mechanical or electro-mechanical device. The Communications Monitoring/Analyzer Server 300 may comprise, for example, one or more server computers operable to communicate with (a) one or more Communication Devices, (b) Mobile Network Provider Server 101 (of FIG. 1), (c) one or more third party servers (e.g., a Communication Routing Facilitator Server 109 of FIG. 1 or an aggregator service server for facilitating the provisioning of one or more subscribers to a communication monitoring service by Communications Monitoring/Analyzer Server 103) and/or (d) one or more additional devices (e.g., gateway server, router devices or other devices for facilitating the routing or management of Communications among devices over a wireless or other network). The Communications Monitoring/Analyzer Server 300 may be operable to facilitate some functions or procedures described herein, such as the receiving, analyzing and reporting of copied Communications, the Communications in some embodiments being received from an SMS-C of a Mobile Network Provider.

The Communications Monitoring/Analyzer Server 300 comprises a processor 310, such as one or more INTEL PENTIUM processors. The processor 310 is in communication with a communication port 320. Communication port 320 comprises a component (which can be embodied as hardware, software and/or firmware) for communicating, directly or indirectly, with one or more other devices, such as one or more Communication Devices and/or Mobile Network Service Provider Server 101). For example, a communication port 320 provides the Communications Monitoring/Analyzer Server 300 the capability of receiving Communications (e.g., SMS messages) from another device (e.g., from a Mobile Network Provider Server 101 or a Communications Routing Facilitator Server 109) and/or sending messages to another device. A communication port 320 may be operable to work in various language and protocol environments, as would be understood by one of ordinary skill in the art (e.g., http, TCP/IP, SMPP).

The processor 310 is further in communication with a memory 330. The memory 330 may comprise an appropriate combination of magnetic, optical and/or semiconductor memory, and may include, for example, Random Access Memory (RAM), Read-Only Memory (ROM), a compact disc and/or a hard disk. The processor 310 and the memory 330 may each be, for example: (i) located entirely within a single computer or other device; or (ii) connected to each other by a remote communication medium, such as a serial port cable, telephone line or radio frequency transceiver. In one embodiment, the Communications Monitoring/Analyzer Server 300 may comprise one or more devices that are connected to a remote server computer for maintaining databases.

The memory 330 stores a one or more software module(s) 301 for directing the processor 310 to perform certain functions. The processor 310 performs instructions of the one or more software module(s) 301, and thereby operates in accordance with at least some of the methods described in detail herein. The software module(s) 301 may be stored in a compressed, uncompiled and/or encrypted format. The software module(s) 301 may include program elements that may be necessary, such as an operating system, a database management system and "device drivers" for allowing the processor 310 to interface with computer peripheral devices. Appropriate program elements are known to those skilled in the art, and need not be described in detail herein.

Some example software module(s) that may be stored in memory 330 include, without limitation: (i) a User Registration Application 301A, which may include instructions for a process to register a Monitoring User and Monitored User and provision such users with a Mobile Network Provider; (ii) a Communication Analyzer Training/Retraining Application 301B, which includes instructions for training and retraining the Communication Analyzer 301C to recognize whether a Communication includes a Violation or whether a Communication qualifies as a Questionable Communication; (iii) a Communication Analyzer 301C, which may include instructions for analyzing a Communication received from a Mobile Network Provider to determine whether the Communication includes a Violation or whether the Communication qualifies as a Questionable Communication; and (iv) a Notification Application 301D, which includes instructions for providing information (e.g., a summary, report or other information) about relevant Communication(s) to a Monitoring User. Each of these example software modules is described in more detail below, via a description of flow diagrams relevant to functions which may be performed by the Communications Monitoring/Analyzer Server 300.

Any of the software module(s) 301A-301D may be part of a single program or integrated into various programs for controlling processor 310. Further, any of the software module(s) 301 may be stored in a compressed, uncompiled and/or encrypted format and include instructions which, when performed by the processor 310, cause the processor 310 to operate in accordance with at least some of the methods described herein. Of course, additional or different software module(s) 301 may be included and it should be understood that the example software module(s) 301A-301D are not necessary in any embodiments. Some examples of additional functions which processor 310 may be directed to perform via one or more software module(s) 301 include, without limitation:

1. receive (directly or via a third party facilitator) a Communication (e.g., a copy of an SMS message sent to/from a Monitored User) from a Mobile Network Provider (either as a single Communication or in bulk);
2. receive (directly or via a third party facilitator) a confirmation from a Mobile Network Provider that a Communication has been successfully transmitted to (or received by) a Communication Device of a Monitored User;
3. request and/or receive a consent for the monitoring and analysis of a Communication from a Monitored User or a third party user with whom a Monitored User is communicating;
4. queue a Communication for analysis by the Communication Analyzer 301C;
5. store a Communication;
6. receive a request to change preferences or settings in a Monitoring User account;
7. generate a data set of words or phrases (including, in some embodiments, a frequency with which the words or phrases appear in a Communication of a certain category or classification and/or a probability of the word or phrase, the probability being an indicator of a Questionable Communication);
8. calculate a probability for a word or phrase or Communication using a Bayesian algorithm;
9. determine an analysis status of an analysis of one or more Communications; and
10. manage and process payments for monitoring and analysis services from registered users.

According to an embodiment, the instructions of any or all of the software module(s) 301 may be read into a main memory from another computer-readable medium, such from a ROM to RAM. Execution of sequences of the instructions in the software module(s) 301 causes processor 310 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 330 further stores (i) a User Account Database 303, which stores information about users who have registered to be Monitoring Users (the information including information regarding the Monitored User(s) corresponding to each Monitoring User); (ii) a Communication Database 305, which stores information about Communications received (and, in some instances, analyzed); and (iii) an Analyzer Dictionary 307, which stores words and phrases used by the Communication Analyzer 301B to determine whether a Communication includes a Violation. Each of these databases is described in detail below with respect to FIG. 5, FIG. 6 and FIG. 7, respectively. It should be understood that additional or different databases may be stored in memory 330 and that not all the databases described as being stored in memory 330 are necessary. For example, a database of information on each of the Mobile Network Providers participating in the Communications Monitoring/Analyzer Service may be stored and/or a database of payments received (or outstanding) for registered users may also be stored. Of course, additional or different tables or databases may be used to store information helpful in carrying out the processes described herein.

Although the databases 303 through 307 are described as being stored in a memory of Communications Monitoring/Analyzer Server 300, in other embodiments some or all of these databases may be partially or wholly stored, in lieu of or in addition to being stored in a memory of Communications Monitoring/Analyzer Server 300, in a memory of one or more other devices. Such one or more other devices may comprise, for example, another computing device with which Communications Monitoring/Analyzer Server 300 is operable to communicate. Further, some or all of the data described as being stored in the memory 330 may be partially or wholly stored (in addition to or in lieu of being stored in the memory 330) in a memory of one or more other devices. Such one or more other devices may comprise, for example, a remote storage service server (e.g., an online back-up storage server, as would be understood by one of ordinary skill in the art).

It should be understood that any or all of the devices of system 100 may in some embodiments comprise one or more of (i) an input device; (ii) an output device; (iii) an input/output device; or (iv) a combination thereof.

An input device, as the term is used herein, may be any device, element or component (or combination thereof) that is capable of receiving an input (e.g., from a user or another device). An input device may communicate with or be part of another device. Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale.

An output device may comprise any device, component or element (or a combination thereof) operable to output information from any of the devices described herein. Examples of an output device include, but are not limited to, a display (e.g., in the form of a touch screen), an audio speaker, an infra-red transmitter, a radio transmitter, an electric motor, a dispenser, an infra-red port, a Braille computer monitor, and a coin or bill dispenser.

An input/output device may comprise components capable of facilitating both input and output functions. In one example, a touch-sensitive display screen comprises an input/output device (e.g., the device outputs graphics and receives selections from an authorized person).

Referring now to FIGS. 4-7, each of these figures illustrates a respective example structure and sample contents of a database that may be useful in some embodiments. The specific data and fields illustrated in FIGS. 4-7, respectively, represents only some embodiments of the information that may be stored in such databases. The data and fields of such databases can be readily modified, for example, to include more or fewer data fields. A single database that is a combination of multiple databases, or a configuration that utilizes multiple databases for a single database illustrated herein may also be employed. Note that in the databases of FIGS. 4-7, a different reference numeral is employed to identify each field. However, in at least one embodiment, fields that are similarly named (e.g., a user identifier) may store similar or the same data in a similar or in the same data format.

As will be understood by those skilled in the art, the schematic illustration and accompanying descriptions of data contained in the sample database presented herein is an exemplary arrangement for stored representations of information. Any number of other arrangements may be employed besides those suggested by the table shown. For example, the embodiments described herein could be practiced effectively using more functionally equivalent databases. Similarly, the illustrated entries of the database represent exemplary information only; those skilled in the art will understand that the number and content of the entries can be different from those illustrated herein. Further, despite the depiction of the database as a table, an object-based model could be used to store and manipulate the data types of one or more embodiments and likewise, object methods or behaviors can be used to implement the processes of one or more embodiments.

FIG. 4 is a tabular representation 400 of an example embodiment of a subscriber services database 205 (e.g., as it may be stored in a memory of a Mobile Network Provider Server 200 and/or in a memory of another device). Tabular representation 400 is referred to herein as subscriber services database 400.

The subscriber services database 400 includes a number of example records or entries, (including records R400-1, R400-2, R400-3, and R400-4), each defining a subscriber of a Mobile Network Provider, along with an indication of whether the subscriber has been provisioned to receive specific services available via the Mobile Network Provider. Those skilled in the art will understand that a subscriber services database 400 may include any number of records. The subscriber services database 400 defines the following example fields (i) a subscriber account number 405 which uniquely identifies an account of a subscriber of the Mobile Network Provider; (ii) a Communication Address 410 which stores one or more addresses via which a Communication may be transmitted to the subscriber associated with the subscriber account; and (iii) a "Monitored Subscriber?" field 415, which indicates whether the Communications sent to (and/or sent from, depending on the embodiment) are to be provided (directly or through a third party facilitator) to the Communications Monitoring/Analyzer Server 300. It should be understood that additional information may be stored regarding a subscriber. For example, a payment account of a user, a postal or email address, a payment history, a name and/or nickname, demographic information, account status and preferences of the subscriber may be stored in some embodiments. It should further be noted that an indication of whether the subscriber has been provisioned for other services (e.g., to receive weather updates, stock value updates, headlines, etc.) may also be stored in additional fields, which are not illustrated in FIG. 4 for purposes of brevity.

The subscriber account number may comprise, for example, a unique account number assigned to the subscriber by the Mobile Network Provider. In some embodiments, the subscriber account number may be an address of a communication device (e.g., a telephone number of a cellular telephone). In some embodiments, the subscriber account number 405 and the communication address 410 may be the same information for a given subscriber. It should be noted that in some embodiments, a single subscriber account number may be associated with more than one Communication Device and thus more than one communication address 415. Records R400-3 and R400-4 illustrate such an embodiment, as they share the same subscriber account number but have different communication addresses. For example, a parent may open an account with the Mobile Network Provider and be assigned a subscriber account number and a communication address (e.g., a telephone number for the parent's cellular telephone). The parent may also, however, add additional communication addresses and/or Communication Devices to the account (e.g., the parent may add a cellular telephone, and thus an additional cellular telephone address for a child).

The communication address 410 stores an address of a Communication Device to which or from which Communications associated with the subscriber account may be transmitted. The communication address may comprise, for example, a telephone number, an e-mail address, an IP address, pager number, MAC address or other unique address which designates a source or recipient for a Communication.

The "Monitored Subscriber?" field 415 stores an indication of whether a subscriber associated with the subscriber account has been provisioned for Communication monitoring, such that Communications transmitted to and/or from the corresponding communication address are to be provided to the Communications Monitoring/Analyzer Server 300. If a user account has been so provisioned (indicated by a "Y" in the illustrative example of FIG. 4), then this indication will cause the Mobile Network Provider Server to execute a routine for providing a copy of each Communication being sent to the corresponding communication address (and, in some embodiments, each Communication being sent from the corresponding communication address) to the Communications Monitoring/Analyzer Server 300. It should be noted that not all Communications associated with a given subscriber account may be so copied and provided to the Communications Monitoring/Analyzer Server 300, even if some of the Communications associated with the given subscriber account are so copied and provided. For example, as illustrated in Records R400-3 and R400-4, for a given subscriber account, Communications associated with the communication address "1.260.10.333" are not to be so copied and provided (since the "Monitored Subscriber?" field 415 indicates an "N" for "No" for this communication address) but Communications associated with the communication address "000-555-2222" are to be so copied and provided (since the "Monitored Subscriber?" field 415 indicates a "Y" for "Yes" for this communication address). An example method for provisioning a subscriber communication device for a Monitoring/Analyzer Service is described below with respect to FIG. 9. An example method for copying and providing Communications for a provisioned subscriber is described below with respect to FIG. 10.

Referring now to FIG. 5, illustrated therein are tabular representations 500A and 500B, which represent example tables of an example embodiment of a record of a user account database 303 (e.g., as it may be stored in a memory of a Communications Monitoring/Analyzer Server 300 and/or in a memory of another device). Tabular representations 500A and 500B are referred to collectively herein as user account database 500.

A user account database 303 may includes a number of example records or entries, each defining a Monitoring User registered with the Communications Monitoring/Analyzer Service, along with information regarding one or more Monitored Users associated with the Monitoring User and the Monitoring User's preferences for the monitoring and analysis of Communications of the one or more Monitored Users. Those skilled in the art will understand that a user account database 303 may include any number of records, entries or tables. The example tables 500A and 500B together represent information that may be stored in a record for a given Monitoring User who has registered with a Communications Monitoring/Analyzer Service.

The user account database table 500A defines the following example fields of an example record (i) a Monitoring User ID 502, which uniquely identifies a Monitoring User (e.g., the user ID may comprise a unique account number, social security number or other unique identifier selected by or assigned to the Monitoring User); (ii) a user name 504 which stores a name (e.g., a formal name or nickname) of the Monitoring User corresponding to the record; (iii) a notification address 506 which stores one or more communication addresses to which a notification (e.g., information about Communications of one or more Monitored Users associated with the Monitoring User who is the subject of a given record) are to be sent, such as an e-mail address, a cellular telephone number and/or an IP address; (iv) a password 508 via which the Monitoring User corresponding to the record may access and updated/modify information in the record (which password may be selected by or assigned to the Monitoring User); (v) the Mobile Network Provider 510, which stores the name of the Mobile Network Provider to which the Monitoring User is subscribed; (vi) a Monitored User name 512 which stores name(s) of one or more users who are Monitored Users to the Monitoring User (i.e., the users whose Communications the Monitoring User has registered to have monitored and/or analyzed); (vii) a Monitored User Address 514 which stores, for each Monitored User associated with the Monitoring User in the record, an address for Communications to/from the Monitored User, the address typically being an address of a Communication Device associated with the Monitored User and thus the address to/from which Communications of the Monitored User are to be monitored and/or analyzed; and (viii) a Monitored User ID 516 which stores, for each Monitored User associated with the Monitoring User in the record, a unique identifier for the Monitored User.

The user account database table 500B stores additional information associated with each Monitored User who has been registered in the Communications Monitoring/Analyzer Service. First, a Monitored User ID 518 stores a unique identifier for identifying a given Monitored User. It should be noted that the Monitored User ID of a given record will correspond to a Monitored User ID of one or more records in user database table 500A (i.e., one can select a Monitored User ID from table 500A in order to look up more information to guide the monitoring and/or analysis of Communications for that Monitored User in table 500B). Table 500B further stores (i) a sensitivity 520 which indicates a sensitivity setting for analyzing Communications associated with the Monitored User; (ii) a monitored categories 522 which indicates one or more categories of Violations for which Communications associated with the Monitored User are to be analyzed (it should be noted that in some embodiments each category may have its own corresponding sensitivity setting); (iii) custom words/phrases 524 which stores a list of words and/or phrases submitted by the Monitoring User corresponding to the Monitored User of the records (e.g., the Monitoring User as identified in field 502 of table 500A) as ones to be considered Violations if found in a Communication of the Monitored Use corresponding to the record (it should be noted that in some embodiments, each monitored category indicated in field 522 may have its own corresponding list of words and/or phrases); (iv) an address book 526 which includes a list of common third party users with which the Monitored User communicates with, to aid in reporting upon the Communications of the Monitored Users. The address book 526 includes (i) a Communication address 526a (e.g., a telephone number or other Communication Device address associated with the third party user) and (ii) a name 526b of the third party user, which in some embodiments may be a nickname of the third party user. In some embodiments, a list of third party users with which the Monitored User is not supposed to be communicating with may also be listed (e.g., such that if a Monitored User communicates with one of these unapproved third party users, the resulting Communication would be considered one which includes a Violation).

The user database 303 (e.g., as illustrated in the example embodiment depicted via tables 500A and 500B) may be used by a Communications Monitoring/Analyzer Service to determine, for example, (i) to which address of a Monitoring User to send a notification to (e.g., a notification comprising a report of Communications of one or more Monitored Users associated with the Monitoring Users, along with indications of which of the Communications (if any) included Violations; (ii) a sensitivity setting to utilize in analyzing a Communication of a Monitored User; (iii) a category of Violations for which to analyze a Communication of a Monitored User; and (iv) custom words or phrases (or third party users) which are to be considered Violations if included in a Communication of a Monitored User.

Referring now to FIG. 6, illustrated therein is a table 600 of an example record illustrating an embodiment of a communication database 305 (e.g., as it may be stored in a memory of a Communication Monitoring/Analyzer Server 300 and/or in a memory of another device). Tabular representation 600 is referred to herein as communication database record 600.

The communication database record 600 includes a number of example fields, each providing information on one or more Communications received by (and/or sent by) a Monitored User on a particular date. Those skilled in the art will understand that a communication database record 600 may include any number of fields. Those skilled in the art will further understand that information about Communications monitored and/or analyzed in accordance with embodiments described herein may be stored in a variety of other formats, organizations or tables. The communication database record 600 defines the following example fields (i) a Communication address 602 which indicates the address to/from which the Communications that are referred to in the record are associated with (may comprise a Communication Device address; examples include, without limitation, a telephone number, IM address or e-mail address); and (ii) a date 604 on which the Communications that are the subject of the record were sent and/or received on. In some embodiments, the communication database record 600 may further include an Monitored User identifier which uniquely identifies the Monitored User associated with the Communications that are the subject of the record. In some embodiments, the Communication Address may comprise the unique Monitored User identifier. The remaining fields 606-614 each provide information on the particular Communications sent/received by the Monitored User who is the subject of a given record, on the date indicated in field 604 and via the communication address indicated in field 602. The remaining example fields indicate: (i) a time 606 which indicates the time of day at which a given Communication was sent or received; (ii) a third party communication address 608 which indicates the communication address of the third party (i.e., the party other than the Monitored Party, and in some cases may be a plurality of third parties) involved in the Communication; (iii) a text 610 of the Communication, which comprise the original words, phrases, shorthand, abbreviations or shorthand of the Communication (as opposed to a translation or paraphrasing, although in some embodiments a translation or paraphrasing may also be stored); (iv) a violation(s) field 612 which indicates the number of Violations found in the Communication upon analysis thereof (with "N/A" being indicated if the Communication has not yet been analyzed or the results of the analysis have not yet been determined); and (v) a confirmed delivery? field 614 which indicates whether a confirmation or verification has been received from the Mobile Network Service Provider associated with the message, the confirmation or verification being that the Communication has been delivered to the Communication Device of the intended recipient (in the illustrative example of FIG. 4, a "Y" is intended to indicated that a confirmation of successful delivery has been received, while a "N" is intended to indicate that a confirmation of successful deliver has not been received). With respect to field 614, as described herein, in some embodiments an analysis of a Communication (and/or a reporting of information about the Communication to the Monitoring User) is not performed unless or until it has been confirmed that the Communication has been successfully delivered to the intended recipient's Communication Device, such that the Communication is no longer considered to be in transit. In some embodiments, an analysis and/or reporting of a Communication may be performed (i) irrespective of whether a confirmation of a successful deliver of the Communication has been received; or (ii) upon the passing of a predetermined period of time (e.g., twenty-four or forty-eight hours) from a time at which the Communication was first received by a Mobile Network Provider for deliver to the intended recipient or from a time of another desirable event or point in time. In some embodiments, communication database record 600 may store additional information about a Communication. For example, (i) the category or categories of Violation(s) may be stored, (i) an identifier for a Communication thread of which a particular Communication is a part may be stored (in some embodiments, a Communication is analyzed for Violations in the context of the thread in which it occurs) and/or (iii) a translation (e.g., from text message or chat message abbreviations to regular language) of a Communication may be stored.

The communication database record 600 may be utilized by a Communication Monitoring/Analyzer Server 300, for example, to store and retrieve information made available to a Monitoring User (e.g., via an e-mailed report or notification and/or via a Web user interface that the Monitoring User may access at his/her convenience). In some embodiments, the text 610 of Communications may be utilized by a Communication Monitoring/Analyzer Server 300 to (i) train or retrain an algorithm (e.g., a Bayesian algorithm) for analyzing Communications; and/or (ii) to feed data into an analyzer algorithm in order to determine whether the Communication includes a Violation.

Figure 7:
FIG. 7 is an example table of an analyzer dictionary, which may be stored for use by a communication monitoring/analyzer server, in accordance with some embodiments.

Referring now to FIG. 7, illustrated therein is a tabular representation 700 of an example embodiment of an analyzer dictionary 307 (e.g., as it may be stored in a memory of a Communication Monitoring/Analyzer Server 300 and/or in a memory of another device). Tabular representation 700 is referred to herein as analyzer dictionary 700. The analyzer dictionary 700 includes a number of example fields, each providing information on a word or phrase which comprise a Violation. In other words, if a word or phrase from the analyzer dictionary 700 is found in a Communication, this will result in the Communication being considered one which includes a Violation (based on the category of Violations the Communication is being analyzed for, the applicable sensitivity setting and the values of these two parameters as associated with a particular word or phrase in the analyzer dictionary 700). Those skilled in the art will understand that an analyzer dictionary 700 may include any number of fields. The analyzer dictionary 700 defines the following example fields (i) a word/phrase field 702 which indicates the word or phrase which is considered to be a Violation; (ii) a sensitivity 704 which indicates a sensitivity setting value associated with the corresponding word or phrase; and (iii) a category 706 associated with the corresponding word or phrase. Thus, for example, if a Monitoring User selects a sensitivity setting of "3" or "medium" as one to be used in analyzing the Communications of a particular Monitored User, and selects the category of Violations for which the Communications of the Monitored User are to be analyzed for to be "10", this information may be used in determining whether a particular Communication associated with the Monitored User has a Violation to be reported to the Monitoring User. For example, assume a particular Communication being analyzed is determined to include the phrase "rasta weed" (which phrase has an associated sensitivity value of "5" and an associated category of "10", as indicated in the last record of analyzer dictionary 307), the presence of this phrase may cause the Communication to be flagged as one that includes a Violation if the Monitoring User selected a sensitivity setting of "5" and a category of Violations of "10" in association with the Monitored User corresponding to the Communication.

The analyzer dictionary 700 may be updated, for example, on a periodic or non-periodic basis. In one embodiment, phrases may be added to the analyzer dictionary 700 based upon analysis of new incoming Communications and the analysis thereof.

It should be noted that although the words illustrated in the analyzer dictionary 700 are Violation words (i.e., if the word appears in a Communication, the Communication includes a violation), in other embodiments an analyzer dictionary may include a table of words that are not necessarily "bad" or "inappropriate" words or words that comprise Violations but rather may comprise a table of words that may be indicative, if they are included in a Communication, that the Communication includes a Violation. For example, some of these words may be Violations themselves or obviously "bad", "inappropriate" or prima facie violations while others may merely be words that typically appear in a Communication that includes a Violation or otherwise has questionable content but that are not themselves questionable words in other contexts. In some embodiments, a probability may be calculated for each word or phrase in such a table, the probability being an indication of the Communication in which the word or phrase appears is a Communication that has questionable content and for which a alert should be output to a Monitoring User.

The generation of the content for such a table and how such content may be used to analyze a Communication for questionable content is described below with respect to FIG. 13A and FIG. 13B and the related description of use of a Bayesian algorithm.

It should be noted that in some embodiments, two or more tables may be included in an analyzer dictionary, one for words that are indicative of a Communication which includes a Violation or questionable content and another for words that are indicative of a Communication which does not include a Violation or questionable content. In some embodiments, a probability may be calculated for each word or phrase in each such table, the probability being (i) an indication that the Communication in which the word or phrase appears is a Communication that has questionable content and for which a alert should be output to a Monitoring User, for the table of words indicative of a Communication which includes a Violation or warrants an alert to a Monitoring User; and (ii) an indication that the Communication in which the word or phrase appears is a Communication that does not have questionable content and for which an alert should not be output to a Monitoring User, for the table of words or phrases indicative of a Communication which does not include a Violation or does not warrant an alert to a Monitoring User.

Figure 8:
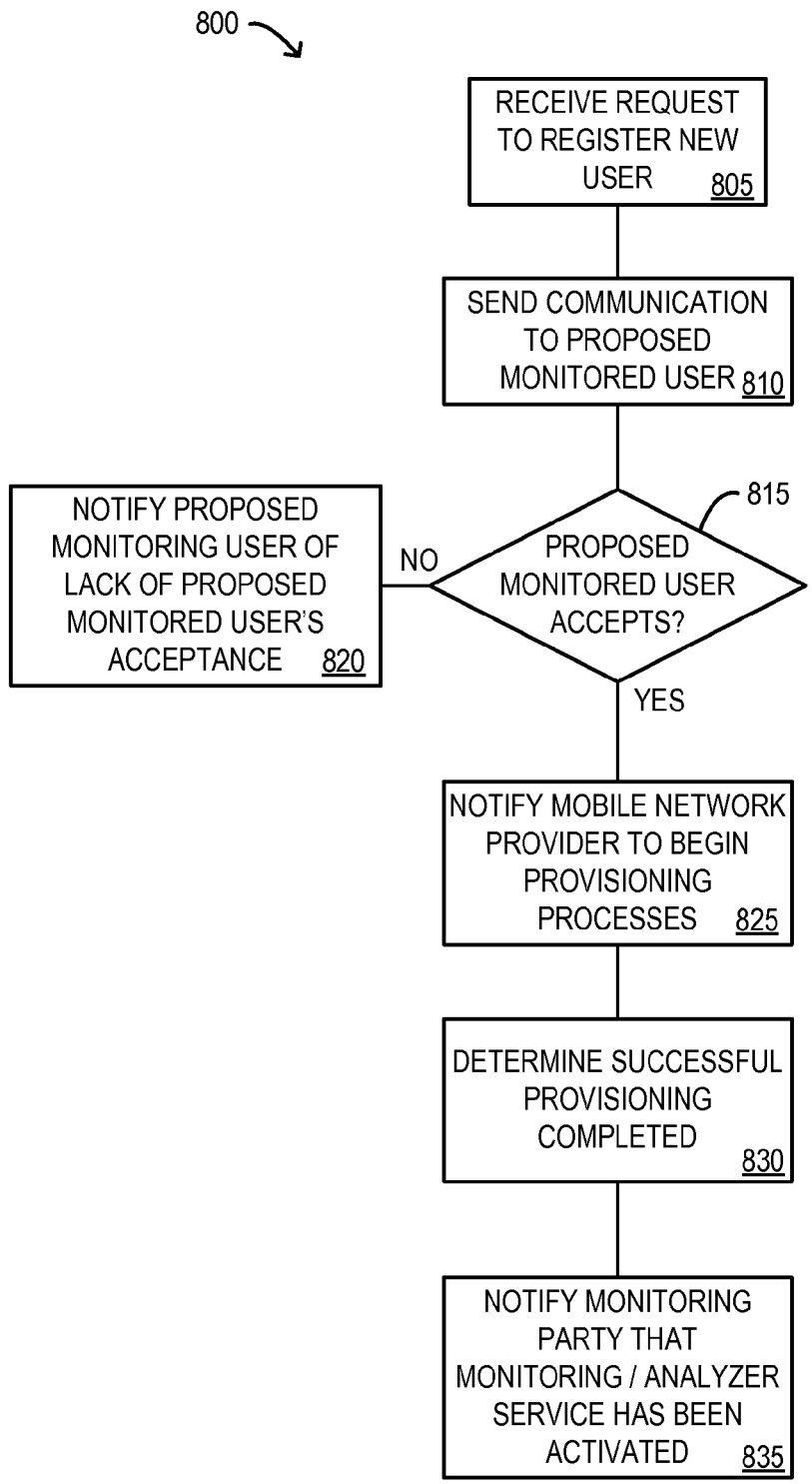
FIG. 8 is flowchart illustrating an example process that may be performed, for example, by a Communication Monitoring/Analyzer Server.

Referring now to FIG. 8, illustrated therein is a flowchart of a process 800 consistent with some embodiments. It should be noted that process 800 (and all processes described herein, including those described with respect to the FIG. 8, FIG. 10, FIG. 12 and FIGS. 13A and 13B) is exemplary only and should not be construed in a limiting fashion. For example, additional and/or substitute steps to those illustrated may be practiced within the scope of the present invention and in one or more embodiments one or more steps may be omitted or modified.

In one embodiment, the process 800 is performed by Communication Monitoring/Analyzer Server 300 as a process for registering a new user as a Monitoring User (as well as registering one or more Monitored Users whose Communications are to be monitored and/or analyzed on behalf of the Monitoring User's behalf). In one embodiment, process 800 comprises the User Registration Application 301A, as stored in the Communications Monitoring/Analyzer Server 300 (FIG. 3).

A request is received from a user to register for the monitoring/analyzer service (805). In one embodiment, the request may be received via a Mobile Service Provider of which the user is a subscriber. For example, a user may access a Web portal of his/her Mobile Service Provider and request to add the monitoring/analyzer service to his account. Such a request may cause the API for the Communication Monitoring/Analyzer Service to be invoked. In another embodiment, the request may be received from the user directly. For example, the use may access a website of the Communication Monitoring/Analyzer Service to make the request and/or transmit a request from a Communication Device of the Monitored User (e.g., by sending an MO-SMS message (Mobile Originated Short Message Service message) from the Communication Device of the Monitored User. In either embodiment, receiving a request for registration (805) may comprise receiving (i) information identifying a proposed Monitored User (e.g., name, account number, etc.) and/or (ii) information identifying a Communication Device of a Monitored User or a Communication address for the Monitored User (e.g., a cellular telephone number, an e-mail address, etc.).

Upon receiving the request to register, the Communication Monitoring/Analyzer server may send a Communication to the proposed Monitored User (810). Sending a Communication to the proposed Monitored User may comprise, in some embodiments, sending a SMS message to the person whose Communications the proposed Monitoring User who is submitting the request desires to have monitored/analyzed (e.g., using the Communication Device identifier or Communication address provided with the request). The Communication may comprise, for example, a notification or request for confirmation or acceptance of having the Communications of the proposed Monitored User monitored and/or analyzed. In one embodiment, such a Communication is sent to the proposed Monitored User via the Mobile Network Provider Server (e.g., via a Mobile Network Provider Server 300, which in some embodiments may comprise an SMS-C, which may be operated by the Mobile Network Provider or another entity on behalf of or otherwise for the Mobile Network Provider). In some embodiments, the Communication sent to the proposed Monitored User may include information describing one or more parameters of the proposed monitoring/analyzer service (e.g., the Communication address for which Communications are proposed to be monitored and/or analyzed, the one or more categories of Violations for which Communications are to be analyzed for, etc.).

In some embodiments (e.g., in an embodiment in which the proposed Monitoring User initiates the registration process by sending a purchase request for the monitoring/subscriber service from the Communication Device of the proposed Monitored User for which Communications are to be analyzed and/or monitored), the Communication of 810 may further include an "advice of charge" which may include information about the cost(s) of the monitoring/analyzer service.

It is then determined whether the proposed Monitored User has accepted to have his/her Communications monitored (815). In some embodiments, this may comprise receiving a return SMS message from the proposed Monitored User with an "accept" or "consent" indication. In embodiments in which the Communication of 810 included and "advice of charge" or "subscribe" confirmation, an acceptance received in 815 may also include an acceptance of the charge(s) and/or confirmation of subscription to the service.

If the proposed Monitored Subscriber does not accept (or, in some embodiments, if an acceptance is not received within a predetermined period of time), the proposed Monitoring User may be informed of the lack of acceptance (820) and the process 800 may end. In embodiments in which the request to register was initially received from a Communication Device of the proposed Monitored User, a notification 820 may not be necessary and the process 800 may simply end upon not receiving the acceptance in 815.

If an acceptance is received in 815, the Mobile Network Provider to which the proposed Monitoring user who made the registration request is subscribed is notified to begin the provisioning process (825). As described herein, in some embodiments the monitoring/analyzer service is provisioned for the Monitored User by cooperation directly with the Mobile Network Provider of the Monitored User. This has several advantages over existing methodologies, many of which rely on an application downloaded to the Communication Device of the Monitored User. For example, having the Monitoring/Analyzer Service receiving access to Communications of a Monitored User by provisioning the Monitored User with the Mobile Network Provider to receive this service allows the monitoring and analyzing service to not be subject to any tampering, un-installation, corruption or other problems with an application that is locally stored at a Communication Device of a Monitored User. It further allows for integration with additional services a user may be subscribed to with a Mobile Network Provider. The provisioning process may comprise, in one embodiment, (i) a Mobile Network Provider provisioning its SMSC by providing to the SMSC information about the Monitored User to be provisioned (e.g., the Communication Device identifier or address (e.g., cellular telephone number); and (ii) the SMSC of the Mobile Network Provider provisioning the Communication Monitoring/Analyzer Service to begin receiving information about the Communications of the Monitored User (e.g., to receive copies of the Communications sent to/from the Communication Device of the Monitored User and/or notifications that such Communications have been successfully transmitted to the Communication Device of the Monitored User. Once a determination has been made that the provisioning process has been successfully completed (830) or that the Monitoring/Analyzer service has otherwise been successfully initiated or activated for a particular Monitored User, a notification is sent to a Monitoring User of the successful activation of the service (835). In some embodiments, a notification may also be sent to the Monitored User, informing the Monitored User of the successful activation of the service. It should be noted that a Monitored User may be provided with a notification and/or reminder that his/her Communications are being monitored and/or analyzed (i) upon activation of the monitoring/analyzer service; (ii) periodically or based on an occurrence of a predetermined event (e.g., one every twenty-four hours, every 10 Communications received, each time the Communication Device of the Monitored User is turned on), (ii) on a random timing basis and/or (iii) on another basis. This may be done in processes other than the process 800. Further, in some embodiments the Monitored User may be required to accept or consent to the monitoring/analyzer service each time he/she is presented with such a notification or reminder in order for the monitoring/analyzer service to continue to be applied to the Monitored User's communications.

For any of the processes described herein which involve exchange of data between the Communication Monitoring/Analyzer Server 103 and the Mobile Network Server 101 (or a third party device other than a Communication Device), it should be noted that the Communication/Analyzer Server 103 may, in some embodiments, accept SMS messages using either a web service or a SMPP protocol and can accepts such messages either individually or in bulk. In one embodiment, the Communication Monitoring/Analyzer Server 103 operates using SMPP Protocol (e.g., Version 3.4). For example: (i) when a Mobile Network Provider uses the SMPP Protocol to send SMS messages to the Communication Monitoring/Analyzer Server 103, the Communication Monitoring/Analyzer Server 103 may act as the server and the Mobile Network Provider 101 may act as the client; and (ii) when the Communication Monitoring/Analyzer Server 103 sends an SMS message to a user (e.g., a Monitoring User or a Monitored User), the Communication Monitoring/Analyzer Server may act as the ESME and the Mobile Network Provider Server 101 may act as the server. In some embodiments, the Mobile Network Provider Server 101 may be required to load balance at its side the SMS messages sent to the Communication Monitoring/Analyzer Server.

Of course, in other embodiments, registering a Monitored User may include a different initiation or activation process (other than the provisioning process described above with respect to process 800) to allow the Monitoring/Analyzer Service to receive information about Communications of a Monitored User who has been successfully registered for the service from a Mobile Network Provider. For example, in some embodiments (e.g., an embodiment in which a proposed Monitoring User transmits a subscription purchase request to purchase the monitoring/analyzer service by sending an MO-SMS from the proposed Monitored User's Communication Device), the Communication Monitoring/Analyzer service may send to a third party aggregator service a request to subscribe the proposed Monitored User for the monitoring/analyzer service. Such a subscription purchase request may be sent, for example, after receiving a confirmation of purchase from the Monitored User's Communication Device. In some embodiments, such a subscription request may include a code that identifies the monitoring/service service as the product being requested. The third party aggregator service may verify that the subscription request is valid and that the subscription does not already exist. The third party aggregator service may then send a billing request to the appropriate Mobile Network Provider. The third party aggregator service may further send, and upon receiving an indication that the Mobile Network Provider has accepted the billing request for the monitoring/analyzer service, a confirmation to the Communication Device of the Monitored User, confirming the subscription for the monitoring/analyzer service (e.g., via an SMS that includes the monthly or other charge for the service). The third party aggregator may also send a notification to the Communication Monitoring/Analyzer server of the successful subscription and, in some embodiments, a billing notification. The billing notification may include, for example, a transaction ID (e.g., as may have been assigned to the transaction when the proposed Monitoring User first requested the subscription via the MO-SMS from the Communication Device or another identifier (e.g., an identifier of the Communication Device from which the subscription request originated). After a successful subscription registration via the alternate process described, the Mobile Network Provider Server 200 may begin to copy and forward Communications to the Communication Monitoring/Analyzer server 300. The Communication Monitoring/Analyzer Server 200 may also transmit instructions to the Monitored User's Communication Device (which may include a URL and/or password) for accessing a site to further set up (e.g., by providing values for one or more parameters) the monitoring/analyzer service.

Figure 9:
FIG. 9 is an example user interface which may be utilized for registering a new user, in accordance with some embodiments.

Referring now to FIG. 9, illustrated therein is an example user interface 900 which may be utilized by a Monitoring User to provide information and set values for parameters useful in monitoring, analyzing and reporting on Communications. A user may utilize such an interface, for example, during a registration process or after a registration and/or provisioning process.

Portion 905 includes information regarding the Monitoring User, such as e-mail address(es), telephone number(s) or other contact information via which information about Communications of a Monitored User whose Communications are to be monitored on behalf of the Monitoring User or how the Monitoring User may be contacted for other purposes (e.g., billing). Portion 905 further allows the Monitoring User to select the Communication address(es) via which he/she would like to be used for notifications. In some embodiments, portion 905 may include additional information, such as field for the Monitoring User to select a password via which the Monitoring User may access a web site to view information about Communications of a Monitored User or to change one or more settings or update information regarding the monitoring/analyzer service.

Portion 910 is an interface via which the Monitoring User may add custom words or phrases to be considered Violations for purposes of analyzing Communications of a Monitored User. As described herein, in some embodiments an Analyzer process analyzes Communications for words included in an Analyzer Dictionary (e.g, an analyzer dictionary 307 of a Communication Monitoring/Analyzer Server 300) as well as for custom or specific words or phrases selected or provided by a Monitoring User.

Portion 915 allows the Monitoring User to set a sensitivity value for purposes of analyzing Communications of a Monitored User. For example, in some embodiments (as illustrated in FIG. 7), a word or phrase in an Analyzer Dictionary may have an associated sensitivity value and be used to determine whether a word or phrase in a Communication is to be considered a Violation, based on the sensitivity setting value in accordance with which the Communication is to be analyzed.

Portion 920 comprises an Address Book, via which a Monitoring User may add information about third parties with which a Monitored User (i) frequently communicates; (ii) is allowed to communicate without a resulting Communication being considered one which includes a Violation; and (iii) is not allowed to communicate, such that any Communication to/from the third party is to be considered a Communication which includes a Violation. The information in the Address Book may be utilized, for example, (i) to analyze a Communication to/from a Monitored User; and/or (ii) to provide a report on Communications to/from a Monitored User (e.g., the report may refer to the third party by the name associated with the third parties Mobile Number, rather than simply listing the Mobile Number involved in the Communication, which may make the report more digestible for the Monitoring User).

Portion 925 provides a menu of categories of Violations that a Monitoring User can select from, indicating which categories of Violations the Communications of a Monitored User should be analyzed for. The categories indicated in FIG. 9 are examples only and should not be interpreted in a limiting fashion. In some embodiments, a Monitoring User may be allowed to select a separate sensitivity scale setting for each selected category.

It should be noted that the information provided in portions 910-925 may be for a particular Monitored User associated with the Monitoring User who is providing/selecting the information (i.e., the Monitored User whose communications are to be monitored and/or analyzed on behalf of the Monitoring User). In some embodiments, a Monitoring User may register multiple Monitored Users whose Communications are to be monitored and/or analyzed on behalf of the Monitoring User. In such embodiments, the information provided in 910-925 may be distinctly provided for each Monitored User or the same such information may be applies for all Monitored Users.

Figure 10:
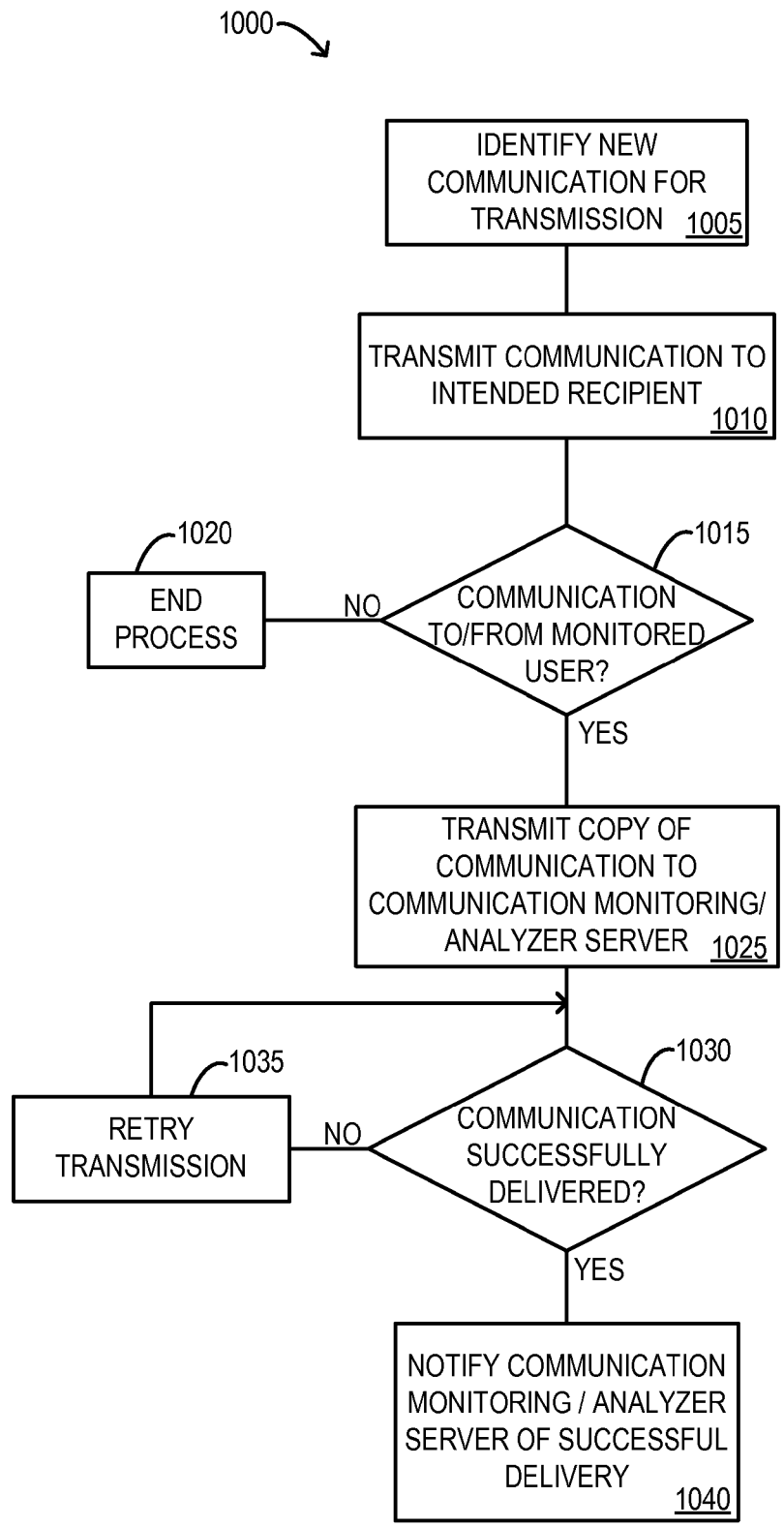
FIG. 10 is a flowchart illustrating an example process for providing copies of communications to a Communication Monitoring/Analyzer Server that may be performed at least by a Mobile Network Provider in accordance with an embodiment.

Referring now to FIG. 10, illustrated therein is a flowchart of an example process 1000 for facilitating the monitoring of Communications by the Communication Monitoring/Analyzer Server 300 (e.g., as carried out by the Mobile Network Provider Server 200). As noted, the process 1000 is from the perspective of the Mobile Network Provider Server 200 (FIG. 2). A process 1100 is also described below, with respect to FIG. 11, as a process for facilitating the monitoring of Communications from the Communication Monitoring/Analyzer Server 300. As noted herein, in some embodiments a Mobile Network Provider Server 300 may comprise an SMS-C of a Mobile Network Provider.

Process 1000 by identifying a new Communication for transmission (1005). For example, an e-mail message, text message, IM, or voice mail may be received by the Mobile Network Provider Server, addressed to one or more intended recipients and for routing by the Mobile Network Provider Server to the one or more intended recipients. The Communication is transmitted or routed to the appropriate intended recipients (1010). For example, the message may be transmitted over Network 113 (FIG. 1) to one or more Communication Devices using a Communication address included in the Communication. It is then determined whether the Communication is to or from a Monitored User. In one embodiment, such a determination may comprise determining whether either the sender of the Communication or one of the intended recipients has been provisioned for the Monitoring/Analyzer service. For example, the Communication address(s) (e.g., a cellular telephone number of a Communication Device or an e-mail address of an e-mail mailbox) associated with the Communication (either or both of the sender's Communication address or the intended recipient's Communication address) may be looked up in a Subscriber Services database (e.g., subscriber services database 400) to determine whether the Communication address corresponds to that of a subscriber who is indicated as a Monitored User. In some embodiments, the Communication itself may include an indication of whether it is to or from a Monitored User (e.g., via an embedded tag, included code or otherwise). In such embodiments, determining whether the Communication is to or from a Monitored User may comprise analyzing the Communication without resorting to a lookup in other files or databases.

If the Communication is not to or from a Monitored User, the process 1000 ends (1020). If the Communication is to or from a Monitored User, a copy of the Communication is transmitted to the Communication Monitoring/Analyzer Server (e.g., directly or via a third party facilitator).

In accordance with some embodiments, it is then determined whether the Communication was successfully delivered to the intended recipient(s) (1030). For example, it may be determined whether the Communication was successfully downloaded to or otherwise transmitted to a Communication Device as identified in a Communication address of the Communication. Determinations of successfully determinations of Communications would be understood by one of skill in the art and are not described in detail herein for purposes of brevity. If a successful deliver is not verified, a retry of the transmission of the Communication may be attempted (1035). If it is determined that the Communication was successfully delivered to the intended recipient(s), a notification (e.g., delivery receipt) for the Communication may be sent to the Communication Monitoring/Analyzer Server (again, either directly or via a third party facilitator).

In accordance with privacy laws of some states, a Communication cannot lawfully be intercepted and analyzed while it is in transit. Thus, in some embodiments it may be beneficial for the Communications Monitoring/Analyzer Server 300 to be informed of when a Communication was successfully delivered to the intended recipient(s), such that it is no longer in transit and can lawfully be intercepted and analyzed. Thus, in some embodiments the Communication Monitoring/Analyzer server will not begin to analyze or otherwise process the copy of the Communication unless and until the earlier of (i) a notification is received from the appropriate Mobile Network Provider Server (or a third party facilitator operable to provide such information) that the Communication was successfully delivered to the intended recipient(s) or (ii) a predetermined period of time (e.g., twenty-four or forty-eight hours) from some predetermined event. The predetermined event may comprise, for example, (i) a time at which the Communication was first received at the Mobile Network Provider server for routing, (ii) a time at which the Communication was first received at the Communication Monitoring/Analyzer Server, or (iii) a time at which a first attempt to deliver the Communication to the intended recipient(s) was first made.

Alternately, in some embodiments, a copy of a Communication to/from a Monitored User may not even be transmitted to the Communication Monitoring/Analyzer Server until it is determined (e.g., by the Mobile Network Provider Server or a third party facilitator) that (i) the Communication was successfully delivered to the intended recipient(s) or (ii) a predetermined period of time from a predetermined event has past. In yet another alternate embodiment, an encrypted copy of the Communication may be transmitted to the Communication Monitoring/Analyzer Server prior to (i) and (ii) above but a key for decrypting the Communication may not be provided to the Communication Monitoring/Analyzer server until earlier of (i) and (ii) is satisfied.

Figure 11:
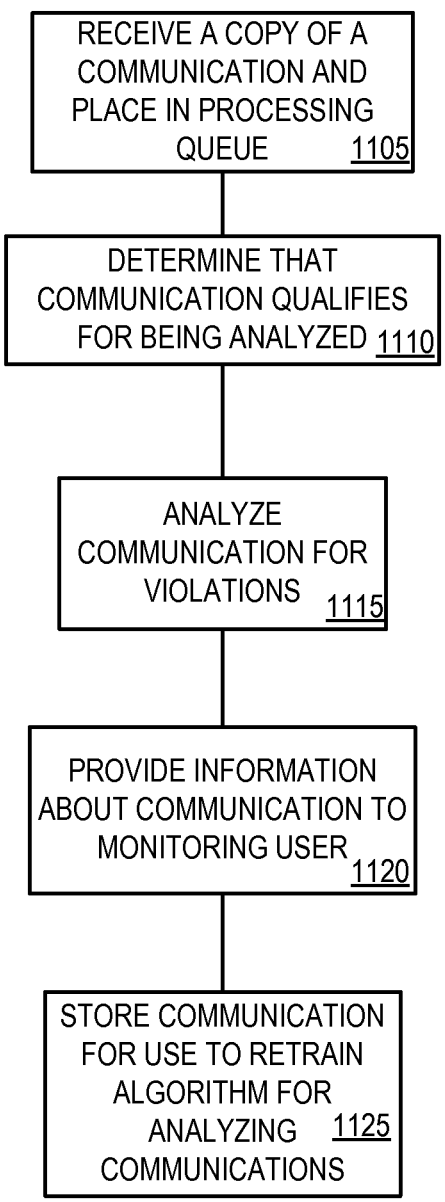
FIG. 11 is a flowchart illustrating an example process for receiving and queuing communications for being analyzed that may be performed by a Communication Monitoring/Analyzer Server in accordance with an embodiment.

Referring now to FIG. 11, illustrated therein is a flowchart for an example monitoring process 1100, from the perspective of a Communications Monitoring/Analyzer Server 300. The process 1100 begins when a copy of a Communication is received (e.g., from a Mobile Network Provider Server 200) and placed in a processing queue (1105). In some embodiments, a Communication may be accepted or received from another device such as a Mobile Network Provider Server 200 or SMS-C via a port using HTTP, SSL, POP3, SMTP, SOAP or another protocol. In another embodiment, the Communication is received via a mail server.

It should be noted that the Communication Monitoring/Analyzer Server may operate under multiple security zones or levels, to provide enhanced security for registered users. For example, Communications may be received under a first security zone, which may include an inpute gate, firewall which will only allow specified ports, or VPN. The Communications may then be moved to a second security zone, in which they are queued for processing and analysis. Such a second security zone may provide for external accessible services such as web applications. The queued Communications may then be processed and analyzed under a third security zone which is still more secure. The results of the analysis (e.g., violations found in Communications, user account information, the content of the Communications) may then be stored in a fourth security zone, which may allow for binary data storage and databases (e.g., SQL databases). As described herein, in some embodiments the content of each received Communication may be stored, as may be a normalized version of the Communication (descried with respect to the analyzer process of FIG. 12), a timestamp of the Communication, senders and intended recipient(s) of a Communication, violations and probabilities of violations found in a Communication, and user account information.

Once the received Communication is queued for processing, it is determined whether the Communication qualifies for being analyzed (1110). In one embodiment, a Communication does not qualify for being analyzed until a "successful deliver" notification is received (e.g., from a Mobile Network Provider Server 300, such as a SMS-C, or another device). In another embodiment, a Communication does not qualify for being analyzed until a predetermined amount of time has passed from a predetermined time (e.g., a predetermined amount of time since the Communication was first received for routing by the Mobile Network Provider Server, a predetermined amount of time since the Communication was first received by the Communication Monitoring/Analyzer Server, a predetermined amount of time since a first attempt to deliver the Communication to the intended recipient(s) was made, etc.). In some embodiments, a Communication does not qualify for being analyzed until a confirmation or consent is received from (i) the Monitored User; or (ii) a third party who is a party to the Communication but is not the Monitored User. In some embodiments, a Communication does not qualify for being analyzed until a decryption key has been provided for decrypting an encrypted form of the Communication originally received (e.g., in some embodiments a Mobile Network Provider may first send an encrypted version of the Communication and subsequently provide a decryption key for decrypting the Communication, such as upon successfully delivering the Communication to the intended recipient(s)).

Once it is determined that the Communication qualifies for being analyzed, it is analyzed for violations (1115). It should be noted that in some embodiments a Communication qualifies for being analyzed immediately upon being received or queued for processing. For example, in some embodiments it is not desirable to wait until a Communication has been successfully delivered to a Communication Device of an intended recipient prior to analyzing the Communication. In another example, a Mobile Network Provider does not forward a Communication until it has been successfully delivered to an intended recipient or otherwise qualifies for being analyzed. An example process for analyzing a Communication for violations is described with respect to FIG. 13A and FIG. 13B.

Information about the Communication is provided to the Monitoring User (1120). For example, information about the Communication may be posted to a web interface accessible by the Monitoring User and/or an e-mail or SMS notification may be sent to the Monitoring User. Such an e-mail or SMS notification may include substantive content about an analysis of a Communication or may simply serve as a reminder or notification to the Monitoring User to access a web interface and view substantive information about the Communication. An example web interface via which a Monitoring User may view information about one or more Communications is illustrated in FIG. 14 and described below.

In accordance with some embodiments, the Communication is further stored for use in retraining an algorithm used to analyze Communications (1125). An example process for training and retraining an algorithm used for analyzing Communications is described below with respect to FIG. 12.

Figure 12:
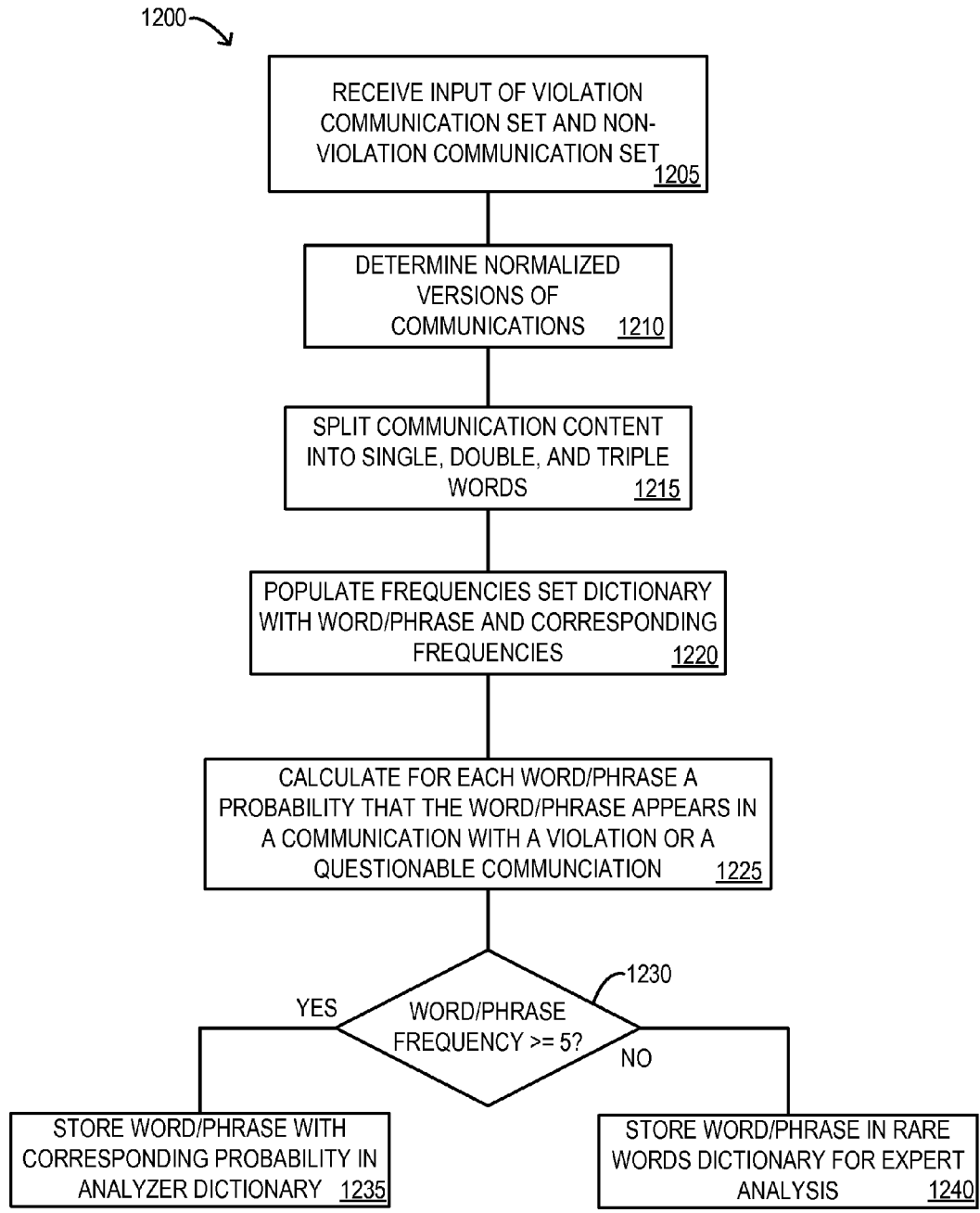
FIG. 12 is a flowchart illustrating an example process for training and retraining an algorithm for analyzing Communications that may be performed by a Communication Monitoring/Analyzer Server in accordance with an embodiment.

Referring now to FIG. 12, illustrated therein is an example process 1200, which may be executed by Communication Monitoring/Analyzer Server 300 or another device. The process 1200 is a process for training (and retraining) an algorithm used in some embodiments to analyze Communications to determine whether they include Violations (or are likely to include Violations), in accordance with embodiments described herein. It should be noted that the process 1200 (and the process 1300, described below with respect to FIG. 13A and FIG. 13B) and the alternate embodiments described with respect to either of these processes are not limited to being used in the systems and methods of monitoring and analyzing Communications for Violations as described herein. Rather, the analyzer processes described herein have a broader applicability to analyzing Communications to determine whether the Communication includes (or is likely to include or posses) a characteristic of interest (a Violation is one example of such a characteristic).

As described herein, in some embodiments a system which include a Communications Monitoring/Analyzer Server 300 may utilize an algorithm to analyze aspects of a Communication (e.g., the content or text (such as words or phrases)) of a Communication such as an SMS, MMS, IM or e-mail message. In some embodiments, the algorithm is used to determine whether a Communication comprises a Questionable Communication (e.g., whether the text of the Communication includes questionable content, such as a word or phrase which is considered a Violation or a word or phrase which is often included in a Communication which includes a Violation). Enhancements to the method may include normalization of the Communication to create a normalized version of the Communication. The Communication may be analyzed for Violations or words or phrases included in a global keyword dictionary applicable generally to Communications being analyzed, as well as for Violations or words or phrases specified or selected by a Monitoring User for the Communications of a Monitored User (i.e., a custom word/phrase list). As described herein, a Monitoring User may create a custom word and/or phrase list, select one or more categories of Violations to analyze for and/or select a sensitivity value for a sensitivity scale, all to be applied in analyzing a Communication of a specified Monitored User.

In some embodiments, the process 1200 may use a Bayesian algorithm to analyze a Communication, which is an algorithm based on Bayes' theorem. The general formula used by the software of the Communications Monitoring/Analyzer Server 300 (or another device) is derived from Bayes' theorem and, in its general form is as follows:

$$Pr(S/W) = \frac{Pr(W/S) * Pr(S)}{Pr(W/S) * Pr(S) + Pr(W/H) * Pr(H)}$$

Where:
Pr(S/W) is the probability that a Communication has a Violation, knowing that the word or phrase comprising the Violation is in the Communication Pr(S) is the overall probability that any given Communication includes a Violation Pr(W/S) is the probability that the word or phrase comprising a Violation appears in Communications which include Violations Pr(H) is the overall probability that any given Communication has no Violations Pr(W/H) is the probability that the word or phrase comprising a Violation appears in Communications which do not include any Violations A modified version of the above formula may be adopted in some embodiments, as follows:

$$p = \frac{p1*p2*\ldots pN}{p1*p2*\ldots*pN + (1-p1)*(1-p2)*\ldots*(1-pN)}$$

Where:

p is the probability that a given Communication includes a Violation p1 is the probability p(S/W1) that the Communication includes a Violation based on the determination that it contains a first word or phrase W1 p2 is the probability p(S/W2) that the Communication includes a Violation based on the fact that it contains a second word or phrase W2 etc. . . .

pN is the probability p(S/WN) that the Communication includes a Violation based on the fact that it contains a Nth word or phrase WN.

Thus, the above version of the Bayesian algorithm may be used in embodiments to determine the probability to associate with a given word or phrase, the probability indicative of the likelihood that a Communication which includes the word or phrase is of questionable content and warrants an alert to the Monitoring User (i.e., that the Communication is a Questionable Communication).

Prior to beginning the process 1200, a set of Communications which include Violations or which are considered Questionable Communications is compiled. This set of Communications (e.g., used for training or retraining purposes) is referred to herein as the Violation Communication Set. Another set of Communications which do not include Violations or which are not considered Questionable Communications is also compiled. This latter set is referred to herein as the Non-Violation Communication Set. Each of these sets may be prepared by an expert. A predefined set or list of words or phrases to be considered Violations may also be prepared by an expert prior to the initiation of process 1200. The process 1200 is performed on both the Violation Communication Set and the Non-Violation Communication Set, to calculate probabilities p1 . . . pN to be used in the algorithm above for analyzing incoming Communications.

At the beginning of the process 1200, input of a Violation Communication Set and an input of a Non-Violation Communication Set is received (1205). A normalized version of each Communication is determined (1210). Determining a normalized version of a Communication may comprise, for example, determining a normalized version of each word or phrase in the Communication. Further, determining a normalized version of a Communication may comprise applying one or more of the following filters or subroutines to each word or phrase: (i) a stemming filter and/or (ii) a synonym filter.

The stemming filter may convert each word to the stemmed form of the word (e.g., "drinking" may be converted to "drink"). The filter may also convert the initial text of a Communication into an ordered normalized words array. The synonym filter will determine synonyms for each word, as defined by experts and populated in a synonym dictionary of the server. The synonym filter may include versions of words or special rules to apply to words that attempt to find the real meaning of misspelled words or words which use colloquial, abbreviations, jargon, shortcuts or numbers substituted for letters (e.g., "al0ne" (which has the number zero rather than the letter "o") may be equated with "alone" in such a synonym dictionary).

The normalized Communication is then split into single, double and triple words (1215). In other words, an array, table or list of events to evaluate may be determined for each Communication, populated with (i) each individual word in the Communication, (ii) each set of two consecutive words in the Communication, and (iii) each set of three consecutive words in the Communication.

A frequency count for each single, double and triple word event is then determined by counting, for each such event, (i) the number of times the event occurs in the Violation Communication Set, for events derived from the Violation Communication Set; and (ii) the number of times the event occurs in the Non-Violation Communication Set, for events derived from the Non-Violation Communication Set (1220). The result may be (i) a Violation Frequencies Set, which includes the list of events (single, double and triple word combinations) derived from the Violation Communication Set and the corresponding frequency of each event across the Violation Communication Set; and (ii) a Non-Violation Frequencies Set, which includes the list of events derived from the Non-Violation Communication Set and the corresponding frequency of each event across the Non-Violation Communication Set.

For each event in the Violation Frequencies Set and the Non-Violations Frequencies Set, a probability p is calculated (1225). For the probabilities calculated for the Violations Frequencies Set, each probability p is the probability that Communication in which the event appears is a Communication that includes a Violation or a Questionable Communication. The thought behind the theorem being that if a particular word (or set of words) appears frequently enough in a Communication which includes a Violation, then the presence of that word (or set of words) in a Communication may be an indicator that the Communication includes a Violation (even if the word itself does not comprise a Violation).

It is then determined, for each event, whether the frequency associated with the event in the Violation Frequency Set or the Non-Violation Frequency Set is greater than or equal to a predetermined number (the example number used in FIG. 12 being 5, this number being for illustrative purposes only and not to be taken in a limiting fashion; 1230). If the frequency is greater than 5, then the event (word or set of words) is stored in the analyzer dictionary. For example, for events from the Violation Frequency Set, a word (or set of words) may be stored in a list or table of words which (i) comprise a Violation; (ii) are indicative that a Communication including the word includes a Violation; or (iii) are indicative that a Communication including the word is a Questionable Communication. This list or table of words is referred to herein as a Probable Violation Words Set. Similarly, for events from the Non-Violation Frequency Set, the words (or sets of words) may be stored in a list or table of words which (i) do not comprise Violations; (ii) are not indicative that a Communication including the word includes a Violation; or (iii) are not indicative that a Communication including the word is a Questionable Violation. This latter list or table is referred to herein as a Probable Non-Violation Words Set. The probability calculated in 1225 for each respective event may be stored in correspondence with each event in either the Probable Violation Words Set or the Probable Non-Violation Words Set, as appropriate. As described below with respect to FIG. 13A and FIG. 13B, these probabilities may then be used to calculate the probability for a new received Communication, to determine the likelihood that the Communication includes a Violation and is a Questionable Communication.

If the frequency for an event is less than a predetermined number (e.g., 5), then the event is stored for analysis by an expert, as a rare word that should be evaluated (and perhaps assigned a custom probability)

In some embodiments, the process 1200 may be re-executed for retraining of the algorithm occasionally or periodically (e.g., daily, once a predetermined number of new Communications have been analyzed, or on another basis), based on an updated Violation Communication Set and a Non-Violation Communication Set. For example, as described with reference to process 1300 (FIG. 13A and FIG. 13B), once newly received Communications are analyzed in accordance with the process 1300 and determined to be Communications which include a Violation or which are Questionable Communications may be added to the Violation Communication Set. Similarly, Communications which are analyzed in accordance with the process 1300 and determined to be Communications which do not include Violations or which are not Questionable Communications may be added to the Non-Violation Communication Set. Accordingly, the Violation Frequency Set and the Non-Violation Frequency Set, as well as the tables of the analyzer dictionary (the words and corresponding probabilities) may also be updated based on the retraining of the algorithm using the process 1200.

It should be noted that the words and corresponding probabilities stored in the Probable Violation Words Set and the Probable Non-Violation Words set may be stored in their stemmed or normalized form, in association with synonyms, in association with a corresponding language (e.g., English, Spanish, etc.) and/or in association with one or more associated Violation Categories.

Figure 13A:
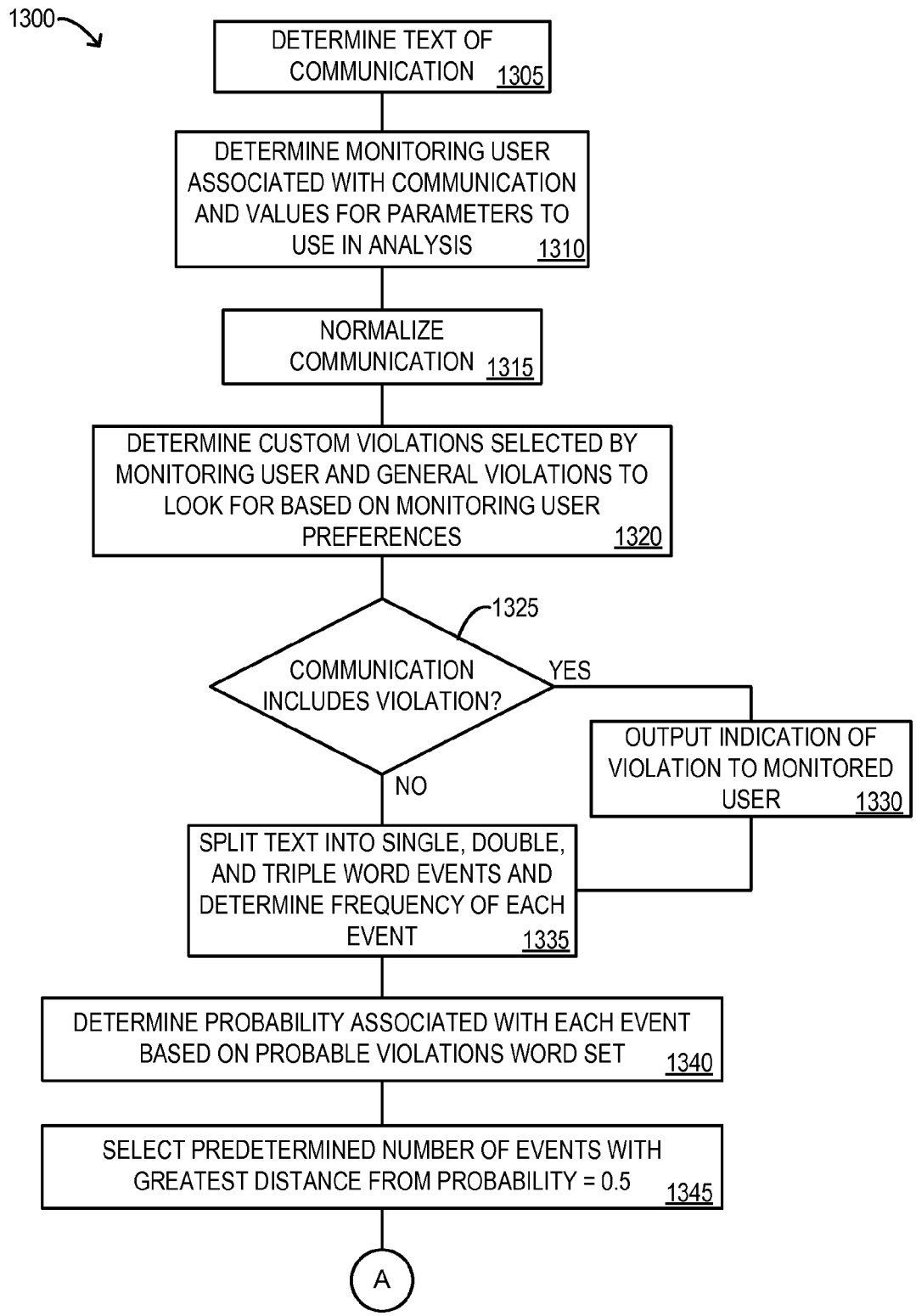
FIG. 13A and FIG. 13B together comprise a flowchart illustrating an example process for analyzing a Communication that may be performed by a Communication Monitoring/Analyzer Server in accordance with an embodiment.
Figure 13B:
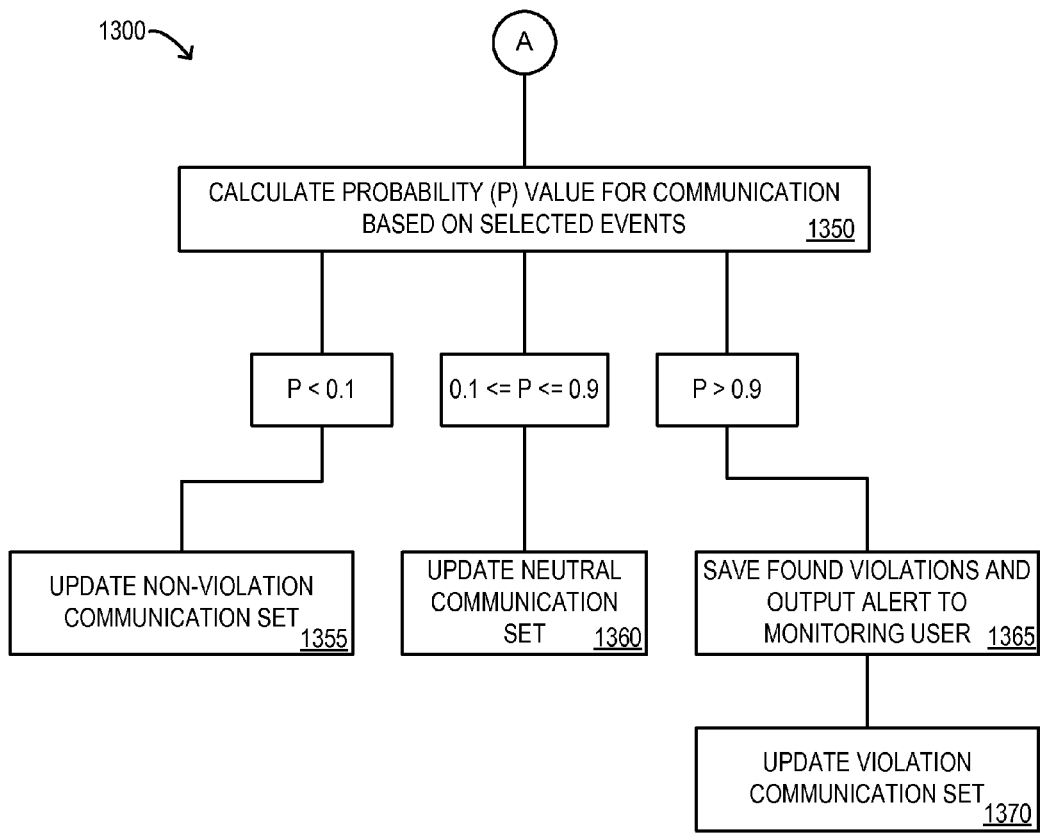

Referring now to FIG. 13A and FIG. 13B, illustrated therein is an example process 1300 for analyzing a Communication received from a Mobile Network Provider Server 200 (e.g., an SMS-C of a Mobile Network Provider). The process 1300 is for determining a probability, using the adopted version of the Bayesian algorithm described above and the Probable Violation Words Set (among other values and parameters) that the Communication includes a Violation or qualifies as a Questionable Communication.

A text or content of a Communication is first determined (1305). It should be noted that while in some embodiments process 1300 may be performed on a single Communication while in other embodiments the process 1300 may be performed on Communications in bulk. Determining a Communication may comprise, for example, determining that a Communication qualifies to be analyzed (e.g., based on a confirmation being received from a Mobile Network Provider that the Communication was successfully delivered to an intended recipient) or selecting the next available Communication from a queue of Communications ready for processing.

The Monitoring User associated with the Communication is then determined and the preferences of the Monitoring User (i.e., the values the Monitoring User has selected for various parameters, such as language, categories of violations, sensitivity scale setting) for monitoring the Communications of a Monitored User are determined (1310). Determining the Monitoring User associated with the Communication may comprise, for example, determining a Communication Address (e.g., a cellular telephone number or other address for a Communication Device) involved in the Communication and looking up in a database the appropriate record based on the Communication Address (e.g., a record in the user account database 303 of FIG. 3) to determine the Monitoring User and the preferences. The preferences (e.g., value for sensitivity scale setting, value for which language to analyze for, value for which categories of Violations to analyze for) are used in process 1300 to determine whether the Communication includes a Violation to which the Monitored User should be alerted.

The Communication is normalized (1315) or a normalized version of the Communication is created, as described above with respect to process 1200. For example, in accordance with some embodiments the words in the communication are stemmed and synonyms are determined for the words.

The custom Violations (e.g., custom words to be looked for in a Communication) as selected by the Monitoring User associated with the Communication, as well as general Violations (e.g., words or phrases that are to be considered Violations for any Communication, which may be classified by category of Violations) are determined (1320). In some embodiments, as described above, an analyzer dictionary may stored words or phrases which have associated therewith a category and/or sensitivity scale setting. In such embodiments, only the words or phrases that correspond to the categories of Violations and sensitivity scale setting selected by the Monitoring User (as determined in 1310) may be selected for use in the subsequent analysis of the Communication.

It is then determined, based on a word and phrase comparison of the words and phrases in the Communication (e.g., in stemmed or otherwise in normalized form) to the words and phrases determined in 1320 (which may also be in stemmed or otherwise in normalized form), whether the Communication includes a Violation (1325). This may comprise, for example, a simple comparison to determine whether a word or phrase in the Communication is in the set of words or phrases determined in 1320.

If a Violation is found in the Communication, an indication of the found Violation is output (1330). For example, a record, table or interface of information accessibly by the Monitoring User associated with the Communication may be updated to reflect the Violation (e.g., a time of the Communication, the text of the Communication, the third party users involved in the Communication and/or other indicator may be stored). In some embodiments, a notification may be sent to the Monitoring User, either including some of this information or notifying the Monitoring User to access the information (e.g., via a password protected web page). In some embodiments, the process 1300 may now end. In other embodiments, a Bayesian algorithm (or other algorithm useful for determining the probability that a Communication includes a Violation) may be used to determine a probability for the Communication, as described in the example steps below.

The text of the Communication is then split into single, double and triple word events (similarly to how this aspect of the process is described above with respect to process 1200), each single, double and triple word combination being considered an event for purposes of the subsequent analysis (1335). The frequency of occurrence of each event may, in some embodiments, also be determined. In accordance with some embodiments, it is the normalized version of each word in the Communication that is so split into the single, double and triple word events.

It should be noted that even if a Violation is found in 1325, the process 1300 may in some embodiments return to 1335 after the indication of the Violation is output. In some embodiments, an indication of a Violation may not be output until the analysis of process 1300 is complete. In other embodiments, if a Violation is found and an indication thereof is output, the process 1300 may not proceed further to analyze the Communication in accordance with the adopted version of the Bayesian algorithm.

The probability associated with each event, based on the current Probably Violations Set determined in process 1200 (as it may have been updated during any retraining of the algorithm), is then determined (1340). A predetermined number (e.g., fifteen (15)) of events with the greatest distance from a predetermined probability (e.g., 0.5) are then selected (1345). These selected events are then used to calculate a probability value (p) for the Communication (1350). For example, the adopted version of the Bayesian algorithm described above with respect to FIG. 12 may be utilized to determine the probability value (p) for the Communication. This probability value (p) is an indicator of the probability that the Communication includes a Violation or is a Questionable Communication.

If the probability value (p) is less than a first predetermined value (e.g., 0.1), then the Non-Violation Communication Set (described above with respect to FIG. 12) is updated to include the current Communication being analyzed (1355). Thus, the current Communication is determined to be one that does not include a Violation (or is not likely to include a Violation) and may be added to the Non-Violation Communication Set, in some embodiments, such that when the Non-Violation Communication Set is subsequently used to retrain the Bayesian algorithm, the current Communication will be part of the analysis.

If the probability value (p) is determined to be greater than or equal to the first predetermined value (e.g., 0.1) but less than or equal to a second predetermined value (e.g., 0.9), the current Communication may, in some embodiments, be added to a Neutral Communication Set (i.e., a set of Communications determined to be neither likely to include a Violation nor likely to not include a Violation); (1360).

If the probability value (p) is determined to be greater than a third predetermined number (e.g., 0.9), then the Communication is determined to be likely to include a Violation (a Questionable Communication) an indication of this finding (e.g., an indication of the Violation) may be stored and an alert may be output to the Monitoring User (1365). The Violation Communication Set may be updated to include the current Communication (1370) such that when the Violation Communication Set is subsequently used to retrain the Bayesian algorithm, the current Communication will be part of the analysis.

It should be noted that, in some embodiments, the adopted version of the Bayesian algorithm may be applied multiple times to a Communication. For example, (i) it may be applied a first time to calculate the probability that a Communication includes a Violation or qualifies as a Questionable Communication based on the determination that it includes a particular word; (ii) it may be applied a second time to calculate the probability that the Communication includes a Violation or qualifies as a Questionable Communication by taking into consideration all of the words in the Communication (or a relevant or desired subset of words); and (ii) sometimes a third time, for rare words.

Referring now to FIG. 14, illustrated therein is an example user interface 1400 via which a Monitoring User may view information about Communications of a Monitored User whose Communications the Monitoring User registered to have monitored. In accordance with some embodiments, the user interface 1400 may be accessed by a Monitoring User using a password and may be on a website hosted by or on behalf of the Communications Monitoring/Analyzer Service.

The example user interface 1400 includes a first portion 1405 which indicates the Monitored Party about whose Communications information is provided in the other portions of the User Interface 1400. In some embodiments, a Monitoring User may have registered to Monitor the Communications of more than one Monitored User and portion 1405 may comprise a dropdown box or other menu or interface via which the Monitoring User may select which Monitored User he/she would like to see information about. Thus, depending on which Monitored User the Monitoring User selects in portion 1405, the information in the remaining portions of user interface 1400 may be changed appropriately.

Portion 1410 includes on format for presenting to the Monitoring User the dates on which a Communication was sent or received by the Monitored User. The portion 1415 includes information summarizing Communications sent or received by the Monitored User on the particular date selected. Portion 1420 details of various Communications sent or received by the Monitored User.

Of course, other information may be presented via a user interface to a Monitoring User. For example, in some embodiments, a Communication Monitoring/Analyzer server may have the ability to call a third party API and determine GPS locations of the Monitored User (e.g., by determining the GPS coordinates or information of the Communication Device via which the Communications are being received or sent) during the time their Communications (e.g., SMS's) are sent and/or received. The Communication Monitoring/Analyzer Server may also have the ability to use its proprietary device-based software and with every Communication (e.g., SMS Message) incorporate GPS coordinates during the time that Communication was sent or received. Further, in some embodiments the Communication Monitoring/Analyzer Server may have the ability to determine the speed of the Communication Device at the time a Communication was sent and/or received. The GPS and/or speed information may be obtained or determined, for example, by communicating directly with the Communication Device and/or via a Mobile Network Provider server or other third party facilitator server. Thus, examples of additional information that may be presented to a Monitoring User about Communications of a Monitored User may include GPS information and/or speed information.

It should be understood that the above are merely examples of embodiments and should not be interpreted in a limiting fashion. Modifications and alterations to one or more methods described herein could be made without departing from the spirit and scope of the present invention. For example, in some embodiments, a Communication Device may be sold preloaded with firmware or hardware that allow a Communication Monitoring/Analyzer Service to monitor and/or analyze Communications sent or received by the Communication Device in accordance with embodiments described herein.

Rules of Interpretation

Numerous embodiments have been described, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention.

Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including", "comprising" and variations thereof mean "including but not limited to", unless expressly specified otherwise.

The term "consisting of" and variations thereof mean "including and limited to", unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c, or (vii) A may comprise a, b and c.

The terms "a", "an" and "the" mean "one or more", unless expressly specified otherwise.

The term "based on" means "based at least on", unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term 'method' or a like term. Accordingly, any reference in a claim to a 'step' or 'steps' of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor.

For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed:

1. A system for analyzing a communication, comprising:
a processing device; and
a memory storing a program, the processor being operable with the program to perform a method, the method comprising:
receiving a communication of a monitored user;
identifying a monitoring user who has registered to have the monitored user's communications analyzed;
determining a value selected by the monitoring user for at least one parameter in accordance with which the communication is to be analyzed, wherein the value comprises at least a value for a sensitivity setting in accordance with which the communication is to be analyzed;
normalizing the communication, thereby determining a normalized version of the communication;
analyzing the normalized version of the communication for a violation, wherein the analyzing is done using the value for the at least one parameter and a Bayesian algorithm to determine whether the communication includes a violation as identified in a predetermined set of violations and a probability that the communication includes a violation,
wherein each violation in the set of predetermined set of violations corresponds to a sensitivity value, and
wherein analyzing includes determining whether a violation from the predetermined set of violations found in the communication has associated therewith a sensitivity value that corresponds to the value for the sensitivity setting selected by the monitoring user; and
providing, if the sensitivity value associated with the violation corresponds to the value for the sensitivity setting selected by the monitoring user, information to the monitoring user about the communication of the monitored user, including an indication of any violations found to be included in the communication during the analyzing.

2. The system of claim 1, wherein the communication comprises at least one of an SMS message, MMS message, a voice mail, an e-mail or an IM.

3. The system of claim 1, wherein receiving the communication comprises:
receiving, from a mobile network provider server and over a wireless network, a copy of a communication for or from the monitored user.

4. The system of claim 3, wherein the mobile network provider server comprises an SMSC operated on behalf of a mobile network provider and the communication comprises an SMS message.

5. The system of claim 1, wherein determining a value selected by the monitoring user for at least one parameter comprises determining one or more categories of violations for which communications of the monitored user are to be analyzed.

6. The system of claim 1, wherein determining a value selected by the monitoring user for at least one parameter comprises determining one or more languages for which the communication is to be analyzed.

7. The system of claim 1, wherein normalizing the communication comprises removing spaces between characters of the communication.

8. The system of claim 1, wherein normalizing the communication comprises substituting letters for numbers included as characters in the communication.

9. The system of claim 1, wherein normalizing the communication comprises converting a word in the communication to a stemmed form of the word.

10. The system of claim 1, wherein normalizing the communication comprises determining a synonym for a word in the communication.

11. The system of claim 1, wherein analyzing the normalized version of the communication comprises determining a chain of communication of which the communication is a part and analyzing the communication in context of the chain, such that words found in other communications in the chain are included in the analyzing.

12. The system of claim 1, wherein the predetermined set of violations includes custom violations specified by the monitoring user.

13. The system of claim 1, wherein analyzing comprises:
analyzing the normalized version of the communication using the Bayesian algorithm a first time to compute a probability that the communication includes a violation, based on a determination that the communication includes a particular word; and
analyzing the normalized version of the communication using the Bayesian algorithm a second time to retrain the Bayesian algorithm.

14. The system of claim 1, further comprising:
only performing the analyzing upon determining that a predetermined event has occurred, the predetermined event comprising one of:
an indication that the communication has been successfully delivered to a communication device of the monitored user has been received; and
a predetermined period of time from a receipt of the communication has passed.

15. The system of claim 1, further comprising:
identifying, during the analyzing, a rare word included in the communication; and
providing the rare word to an expert for further analysis, to determine whether the communication includes a violation.

16. A method comprising:
receiving a communication of a monitored user;
identifying a monitoring user who has registered to have the monitored user's communications analyzed;
determining, by a processing device, a value selected by the monitoring user for at least one parameter in accordance with which the communication is to be analyzed, wherein the value comprises at least a value for a sensitivity setting in accordance with which the communication is to be analyzed;
normalizing, by the processing device, the communication, thereby determining a normalized version of the communication;
analyzing, by the processing device, the normalized version of the communication for a violation, wherein the analyzing is done using the value for the at least one parameter and a Bayesian algorithm to determine whether the communication includes a violation as identified in a predetermined set of violations and a probability that the communication includes a violation,
wherein each violation in the set of predetermined set of violations corresponds to a sensitivity value, and
wherein analyzing includes determining whether a violation from the predetermined set of violations found in the communication has associated therewith a sensitivity value that corresponds to the value for the sensitivity setting selected by the monitoring user; and
providing, if the sensitivity value associated with the violation corresponds to the value for the sensitivity setting selected by the monitoring user, information to the monitoring user about the communication of the monitored user, including an indication of any violations found to be included in the communication during the analyzing.

17. A non-transitory computer readable medium including instructions for directing a processor to perform a method, the method comprising:
receiving a communication of a monitored user;
identifying a monitoring user who has registered to have the monitored user's communications analyzed;
determining a value selected by the monitoring user for at least one parameter in accordance with which the communication is to be analyzed, wherein the value comprises at least a value for a sensitivity setting in accordance with which the communication is to be analyzed;
normalizing the communication, thereby determining a normalized version of the communication;
analyzing the normalized version of the communication for a violation, wherein the analyzing is done using the value for the at least one parameter and a Bayesian algorithm to determine whether the communication includes a violation as identified in a predetermined set of violations and a probability that the communication includes a violation,
wherein each violation in the set of predetermined set of violations corresponds to a sensitivity value, and
wherein analyzing includes determining whether a violation from the predetermined set of violations found in the communication has associated therewith a sensitivity value that corresponds to the value for the sensitivity setting selected by the monitoring user; and
providing, if the sensitivity value associated with the violation corresponds to the value for the sensitivity setting selected by the monitoring user, information to the monitoring user about the communication of the monitored user, including an indication of any violations found to be included in the communication during the analyzing.

* * * * *